US012679008B2

(12) United States Patent
Chang et al.

(10) Patent No.: US 12,679,008 B2
(45) Date of Patent: Jul. 14, 2026

(54) METHOD FOR MAKING UV AND HEVL-ABSORBING OPHTHALMIC LENSES

(71) Applicant: Alcon Inc., Fribourg (CH)

(72) Inventors: Frank Chang, Cumming, GA (US); Troy Vernon Holland, Suwanee, GA (US); Houliang Tang, Cumming, GA (US); Adam K. Sniady, Lilburn, GA (US)

(73) Assignee: Alcon Inc., Fribourg (CH)

(*) Notice: Subject to any disclaimer, the term of this patent is extended or adjusted under 35 U.S.C. 154(b) by 483 days.

(21) Appl. No.: 18/308,210

(22) Filed: Apr. 27, 2023

(65) Prior Publication Data

US 2023/0364832 A1 Nov. 16, 2023

Related U.S. Application Data

(60) Provisional application No. 63/335,753, filed on Apr. 28, 2022.

(51) Int. Cl.

| | |
|---|---|
| ***B29C 39/02*** | (2006.01) |
| ***B29C 39/00*** | (2006.01) |
| ***B29C 39/26*** | (2006.01) |
| ***B29C 39/36*** | (2006.01) |
| ***B29D 11/00*** | (2006.01) |
| ***B29K 83/00*** | (2006.01) |
| ***B29K 101/10*** | (2006.01) |
| ***G02B 1/04*** | (2006.01) |

(52) U.S. Cl.

CPC .......... *B29C 39/026* (2013.01); *B29C 39/006* (2013.01); *B29C 39/26* (2013.01); *B29C 39/36* (2013.01); *B29D 11/00038* (2013.01); *G02B 1/043* (2013.01); *B29K 2083/00* (2013.01); *B29K 2101/10* (2013.01)

(58) Field of Classification Search

CPC ...................................................... G02B 1/043

See application file for complete search history.

(56) References Cited

U.S. PATENT DOCUMENTS

| | | | |
|---|---|---|---|
| 3,100,778 | A | 8/1963 | Elliot |
| 3,562,172 | A | 2/1971 | Ono et al. |
| 3,567,605 | A | 3/1971 | Becker |
| 3,578,602 | A | 5/1971 | Ono et al. |
| 3,671,543 | A | 6/1972 | Koga et al. |
| 4,136,250 | A | 1/1979 | Mueller et al. |
| 4,153,641 | A | 5/1979 | Deichert et al. |

(Continued)

OTHER PUBLICATIONS

Judith Radebner et al., "Tetraacylstannanes as Long-Wavelength Visible-Light Photoinitiators with Intriguing Low Toxicity", Chem. Eur. J., 2018, 24, pp. 8281-8285.

(Continued)

*Primary Examiner* — Michael F Pepitone

(74) *Attorney, Agent, or Firm* — Jian Zhou

(57) ABSTRACT

Described herein is a cost-effective and time-efficient method for producing UV- and HEVL-absorbing silicone hydrogel contact lenses capable of blocking ultra-violet ("UV") radiation and high-energy-violet light (HEVL) with wavelengths from 380 nm to 440 nm, thereby protecting eyes to some extent from damages caused by UV and HEVL radiation. This invention also provides UV- and HEVL-absorbing absorbing contact lenses made according to a method of the invention.

20 Claims, 1 Drawing Sheet

(56) References Cited

U.S. PATENT DOCUMENTS 4,182,822 A 1/1980 Chang
4,189,546 A 2/1980 Deichert et al.
4,215,010 A 7/1980 Hovey et al.
4,254,248 A 3/1981 Friends et al.
4,259,467 A 3/1981 Keogh et al.
4,260,725 A 4/1981 Keogh et al.
4,261,875 A 4/1981 LeBoeuf
4,276,402 A 6/1981 Chromecek
4,312,575 A 1/1982 Peyman et al.
4,327,203 A 4/1982 Deichert et al.
4,341,889 A 7/1982 Deichert et al.
4,342,668 A 8/1982 Hovey et al.
4,343,927 A 8/1982 Chang
4,355,147 A 10/1982 Deichert et al.
4,440,672 A 4/1984 Chu
4,444,711 A 4/1984 Schad
4,460,534 A 7/1984 Boehm et al.
4,486,577 A 12/1984 Mueller et al.
4,543,398 A 9/1985 Bany et al.
4,605,712 A 8/1986 Mueller et al.
4,632,844 A 12/1986 Yanagihara et al.
4,634,767 A 1/1987 Hoelscher et al.
4,636,561 A 1/1987 Hosoda
4,637,698 A 1/1987 Kwak et al.
4,661,575 A 4/1987 Tom
4,684,538 A 8/1987 Klemarczyk
4,699,473 A 10/1987 Chu
4,703,097 A 10/1987 Wingler et al.
4,719,296 A 1/1988 Irie et al.
4,720,547 A 1/1988 Kwak et al.
4,772,700 A 9/1988 Kawauchi et al.
4,784,474 A 11/1988 Yamamoto et al.
4,785,097 A 11/1988 Kwak
4,816,584 A 3/1989 Kwak et al.
4,818,096 A 4/1989 Heller et al.
4,826,977 A 5/1989 Heller et al.
4,831,142 A 5/1989 Kwak
4,833,218 A 5/1989 Lee
4,837,289 A 6/1989 Mueller et al.
4,880,667 A 11/1989 Welch
4,929,693 A 5/1990 Akashi
4,931,219 A 6/1990 Kwiatkowski et al.
4,931,221 A 6/1990 Heller
4,954,586 A 9/1990 Toyoshim et al.
4,954,587 A 9/1990 Mueller
4,959,471 A 9/1990 Meizig
4,980,089 A 12/1990 Heller
4,986,934 A 1/1991 Kwiatkowski et al.
5,010,141 A 4/1991 Mueller
5,034,461 A 7/1991 Lai et al.
5,039,761 A 8/1991 Ono et al.
5,055,576 A 10/1991 Castaldi et al.
5,066,818 A 11/1991 Gemert et al.
5,070,170 A 12/1991 Robertson et al.
5,070,215 A 12/1991 Bambury et al.
5,079,319 A 1/1992 Mueller
5,110,922 A 5/1992 Castaldi et al.
5,114,621 A 5/1992 Guglielmetti et al.
5,139,707 A 8/1992 Guglielmetti et al.
5,166,345 A 11/1992 Akashi et al.
5,171,636 A 12/1992 Castaldi et al.
5,180,524 A 1/1993 Casilli et al.
5,186,867 A 2/1993 Castaldi et al.
5,200,116 A 4/1993 Heller
5,238,931 A 8/1993 Yoshikawa et al.
5,238,981 A 8/1993 Knowles
5,244,602 A 9/1993 Van Gemert
5,274,132 A 12/1993 VanGemert
5,340,857 A 8/1994 Van Gemert
5,346,946 A 9/1994 Yokoyama et al.
5,358,995 A 10/1994 Lai et al.
5,369,158 A 11/1994 Knowles
5,384,077 A 1/1995 Knowles
5,387,632 A 2/1995 Lai et al.
5,395,567 A 3/1995 Van Gemert et al.
5,399,687 A 3/1995 Melzig
5,405,958 A 4/1995 VanGemert
5,411,679 A 5/1995 Kumar
5,416,132 A 5/1995 Yokoyama et al.
5,429,774 A 7/1995 Kumar
5,449,729 A 9/1995 Lai
5,451,344 A 9/1995 Knowles et al.
5,451,617 A 9/1995 Lai et al.
5,458,814 A 10/1995 Kumar et al.
5,458,815 A 10/1995 Knowles
5,464,567 A 11/1995 Knowles et al.
5,466,398 A 11/1995 Van Gemert et al.
5,486,579 A 1/1996 Lai et al.
5,508,317 A 4/1996 Müller
5,514,817 A 5/1996 Knowles
5,520,853 A 5/1996 Rickwood et al.
5,552,090 A 9/1996 Van Gemert et al.
5,552,091 A 9/1996 Kumar
5,565,147 A 10/1996 Knowles et al.
5,573,712 A 11/1996 Kumar et al.
5,578,252 A 11/1996 Van Gemert et al.
5,585,042 A 12/1996 Knowles
5,623,005 A 4/1997 Rickwood et al.
5,637,262 A 6/1997 Van Gemert et al.
5,637,709 A 6/1997 Melzig
5,645,767 A 7/1997 Van Gemert
5,650,098 A 7/1997 Kumar et al.
5,651,923 A 7/1997 Kumar et al.
5,656,206 A 8/1997 Knowles et al.
5,658,500 A 8/1997 Kumar et al.
5,658,501 A 8/1997 Kumar et al.
5,674,432 A 10/1997 Knowles et al.
5,698,141 A 12/1997 Kumar
5,723,072 A 3/1998 Kumar
5,728,758 A 3/1998 Smith
5,730,908 A 3/1998 Nodari et al.
5,744,070 A 4/1998 Kumar
5,759,450 A 6/1998 Hughes et al.
5,760,100 A 6/1998 Nicolson et al.
5,783,116 A 7/1998 Lin
5,789,464 A 8/1998 Müller
5,801,243 A 9/1998 Melzig et al.
5,808,063 A 9/1998 Kumar
5,811,034 A 9/1998 Lin
5,831,090 A 11/1998 Paltchkov et al.
5,833,885 A 11/1998 Rickwood et al.
5,843,346 A 12/1998 Morrill
5,849,810 A 12/1998 Müller
5,869,658 A 2/1999 Lin et al.
5,879,592 A 3/1999 Kumar
5,891,368 A 4/1999 Kumar
5,894,002 A 4/1999 Boneberger et al.
5,955,520 A 9/1999 Heller et al.
5,961,892 A 10/1999 Gemert et al.
5,962,548 A 10/1999 Vanderlaan et al.
5,981,634 A 11/1999 Smith et al.
5,981,675 A 11/1999 Valint, Jr. et al.
5,998,520 A 12/1999 Krishnan et al.
6,004,486 A 12/1999 Chan
6,017,121 A 1/2000 Chateau et al.
6,018,059 A 1/2000 Chan
6,019,914 A 2/2000 Lokshin et al.
6,022,495 A 2/2000 Kumar
6,022,497 A 2/2000 Kumar
6,030,555 A 2/2000 Chan
6,034,193 A 3/2000 Henry et al.
6,039,913 A 3/2000 Hirt et al.
6,065,836 A 5/2000 Krishnan et al.
6,106,744 A 8/2000 Van Gemert et al.
6,107,395 A 8/2000 Rosthauser et al.
6,113,814 A 9/2000 Gemert et al.
6,146,554 A 11/2000 Melzig et al.
6,149,841 A 11/2000 Kumar
6,153,126 A 11/2000 Kumar
6,166,236 A 12/2000 Bambury et al.
6,221,284 B1 4/2001 Florent et al.
6,248,264 B1 6/2001 Clarke et al.
6,296,785 B1 10/2001 Nelson et al.
6,315,928 B1 11/2001 Mann et al.

(56) References Cited

U.S. PATENT DOCUMENTS

| | | | |
|---|---|---|---|
| 6,342,459 B1 | 1/2002 | Melzig et al. | |
| 6,348,604 B1 | 2/2002 | Nelson et al. | |
| 6,353,102 B1 | 3/2002 | Kumar | |
| 6,367,929 B1 | 4/2002 | Maiden et al. | |
| 6,414,057 B1 | 7/2002 | Crisci et al. | |
| 6,451,871 B1 | 9/2002 | Winterton et al. | |
| 6,478,988 B1 | 11/2002 | Hughes et al. | |
| 6,627,124 B1 | 9/2003 | Herbrechtsmeier et al. | |
| 6,630,597 B1 | 10/2003 | Lin et al. | |
| 6,719,929 B2 | 4/2004 | Winterton et al. | |
| 6,762,264 B2 | 7/2004 | Kunzler et al. | |
| 6,793,973 B2 | 9/2004 | Winterton et al. | |
| 6,800,225 B1 | 10/2004 | Hagmann et al. | |
| 6,811,805 B2 | 11/2004 | Gilliard et al. | |
| 6,822,016 B2 | 11/2004 | McCabe et al. | |
| 6,867,245 B2 | 3/2005 | Iwata et al. | |
| 6,896,926 B2 | 5/2005 | Qiu et al. | |
| 7,214,809 B2 | 5/2007 | Zanini et al. | |
| 7,384,590 B2 | 6/2008 | Kelly et al. | |
| 7,387,759 B2 | 6/2008 | Kelly et al. | |
| 7,423,074 B2 | 9/2008 | Lai et al. | |
| 7,556,750 B2 | 7/2009 | Xiao et al. | |
| 7,584,630 B2 | 9/2009 | Van Gemert | |
| 7,858,000 B2 | 12/2010 | Winterton | |
| 7,999,989 B2 | 8/2011 | Asai et al. | |
| 8,147,897 B2 | 4/2012 | Ferreiro et al. | |
| 8,158,037 B2 | 4/2012 | Chopra et al. | |
| 8,163,206 B2 | 4/2012 | Chang | |
| 8,409,599 B2 | 4/2013 | Wu et al. | |
| 8,415,405 B2 | 4/2013 | Maggio et al. | |
| 8,475,529 B2 | 7/2013 | Clarke | |
| 8,480,227 B2 | 7/2013 | Qiu et al. | |
| 8,529,057 B2 | 9/2013 | Qiu et al. | |
| 8,557,334 B2 | 10/2013 | Samuel et al. | |
| 8,614,261 B2 | 12/2013 | Iwata et al. | |
| 8,658,748 B2 | 2/2014 | Liu | |
| 8,697,770 B2 | 4/2014 | Duis et al. | |
| 8,698,117 B2 | 4/2014 | He et al. | |
| 8,741,188 B2 | 6/2014 | Chopra et al. | |
| 8,835,525 B2 | 9/2014 | Kuyu et al. | |
| 8,993,651 B2 | 3/2015 | Chang et al. | |
| 9,028,728 B2 | 5/2015 | Bancroft et al. | |
| 9,029,532 B2 | 5/2015 | Dabideen et al. | |
| 9,052,438 B2 | 6/2015 | Xiao et al. | |
| 9,097,840 B2 | 8/2015 | Chang | |
| 9,097,916 B2 | 8/2015 | Chopra et al. | |
| 9,103,965 B2 | 8/2015 | Chang | |
| 9,187,601 B2 | 11/2015 | Huang | |
| 9,217,813 B2 | 12/2015 | Liu et al. | |
| 9,315,669 B2 | 4/2016 | Holland et al. | |
| 9,465,234 B2 | 10/2016 | Chopra | |
| 9,475,827 B2 | 10/2016 | Chang | |
| 9,487,499 B2 | 11/2016 | He et al. | |
| 9,505,184 B2 | 11/2016 | Kolluru | |
| 9,904,074 B2 | 2/2018 | Duis | |
| 10,081,697 B2 | 9/2018 | Huang | |
| 10,197,707 B2 | 2/2019 | Xiao | |
| 10,254,567 B2 | 4/2019 | Chang | |
| 10,268,053 B2 | 4/2019 | Holland et al. | |
| 10,301,451 B2 | 5/2019 | Jing | |
| 10,322,993 B2 | 6/2019 | Chang | |
| 10,465,047 B2 | 11/2019 | Jing | |
| 10,501,446 B2 | 12/2019 | He et al. | |
| 10,502,998 B2 | 12/2019 | Xu et al. | |
| 10,532,997 B2 | 1/2020 | He et al. | |
| 11,142,592 B2 | 10/2021 | Moszner et al. | |
| 2015/0094393 A1* | 4/2015 | Holland .................. | C08L 83/04<br>522/66 |
| 2018/0355112 A1* | 12/2018 | Zhang .................... | C08G 77/14 |
| 2019/0194362 A1* | 6/2019 | Moszner .................. | C08K 5/57 |
| 2021/0261578 A1 | 8/2021 | Moszner et al. | |
| 2021/0371731 A1 | 12/2021 | Jing et al. | |

OTHER PUBLICATIONS

Moritz Mitterbauer et al., "Acylstannanes: Cleavable and Highly Reactive Photoinitiators for Radical Photopolymerization at Wavelengths above 500 nm with Excellent Photobleaching Behavior", Angew. Chem. Int. Ed., 2018, 57, pp. 12146-12150.

* cited by examiner

METHOD FOR MAKING UV AND HEVL-ABSORBING OPHTHALMIC LENSES

This application claims the benefit under 35 USC § 119 (e) of U.S. provisional application No. 63/335,753 filed 28 Apr. 2022, herein incorporated by reference in its entirety.

This invention is related to a method for producing UV-absorbing silicone hydrogel contact lenses capable of blocking ultra-violet ("UV") radiation and high-energy-violet light (HEVL) with wavelengths from 380 nm to 440 nm, thereby protecting eyes to some extent from damages caused by UV and HEVL radiation. This invention also provides UV- and HEVL-absorbing ophthalmic lenses made according to a method of the invention.

BACKGROUND

Conventionally, UV-absorbing compounds have been incorporated into contact lenses to make UV-absorbing contact lenses to protect eyes from UV-radiations. Recently, HEVL-absorbing compounds have been proposed to be incorporated into contact lenses for protecting eyes from HEVL-radiation (see, U.S. Pat. Nos. 9,315,669, 10,254,567, 10,268,053, and 10,322,993).

DAILIES TOTAL1@ for Astigmatism water gradient daily contact lenses, which are capable of blocking UV and HEVL radiation, have been produced by using an acylgermanium visible light photoinitiator in a silicone hydrogel lens formulation and an unconventional cast-molding technology—the so-called Lightstream Technology™ (ALCON), as illustrated in U.S. Pat. Nos. 5,508,317, 5,789,464, 5,849,810, 6,800,225, and 8,163,206. The Lightstream Technology™ involves (1) a lens-forming composition, (2) reusable molds produced in high precision, and (3) curing under a spatial limitation of actinic radiation (e.g., UV/visible light) for a very short period of time (e.g., less than about 30 seconds). Lenses produced according to the Lightstream Technology™ can have high consistency and high fidelity to the original lens design, because of use of reusable, high precision molds. In addition, contact lenses with high quality can be produced at relatively lower cost due to the short curing time and a high production yield. However, acylgermanium visible light photoinitiators lack curing efficiency upon irradiation with sources operating above 450 nm. When a relatively high amount of a HEVL absorber is added to a lens formulation for making contact lenses capable of blocking significantly light transmission in a range of 380 nm to 500 nm, activation with light with a wavelength greater than 450 nm, e.g. 472 nm, might be needed. Then, acylgermanium visible light photoinitiators may not be suitable for making such contact lenses.

Therefore, there is still a need for a method for making UV- and HEVL-absorbing contact lenses from a mixture of lens-forming materials according to the Lightstream Technology™.

SUMMARY

In one aspect, the invention provides a method for producing UV- and HEVL-absorbing silicone hydrogel contact lenses, the method comprising the steps of: (1) providing a mold for making a soft contact lens, wherein the mold has a first mold half with a first molding surface defining the anterior surface of a contact lens and a second mold half with a second molding surface defining the posterior surface of the contact lens, wherein said first and second mold halves are configured to receive each other such that a cavity is formed between said first and second molding surfaces; (2) introducing a lens-forming composition into the cavity, wherein the lens-forming composition comprises (i) at least one hydrophilic vinylic monomer, (ii) at least one siloxane-containing vinylic monomer and/or at least one polysiloxane vinylic crosslinker, (iii) at least one polymerizable UV-absorbing compound and at least one polymerizable HEVL-absorbing compound in amounts sufficient to provide the lens-forming composition with an average UVB transmittance of about 10% or less between 280 and 315 nanometers, an average UVA transmittance of about 30% or less between 315 and 380 nanometers, and an average Violet transmittance of about 70% or less between 380 nm and 440 nm, and (iv) from about 0.05% to about 1.5% by weight of at least one acyltin photoinitiator capable of initiating a free-radical polymerization under irradiation with a light source including a light in the region of from 455 nm to 510 nm; and (3) irradiating the lens-forming composition in the mold by using the light source including a light in a region of from 455 nm to 510 nm, so as to form the UV- and HEVL-absorbing silicone hydrogel contact lens, wherein the formed UV-absorbing silicone hydrogel contact lens has a UVB transmittance of about 10% or less between 280 and 315 nanometers and a UVA transmittance of about 30% or less between 315 and 380 nanometers and and (c) the Violet transmittance of about 70% or less between 380 nm and 440 nm.

In another aspect, the invention provides UV- and HEVL-absorbing contact lenses obtained according to a method of the invention.

BRIEF DESCRIPTIONS OF THE DRAWINGS

DETAILED DESCRIPTION

Figure 1:
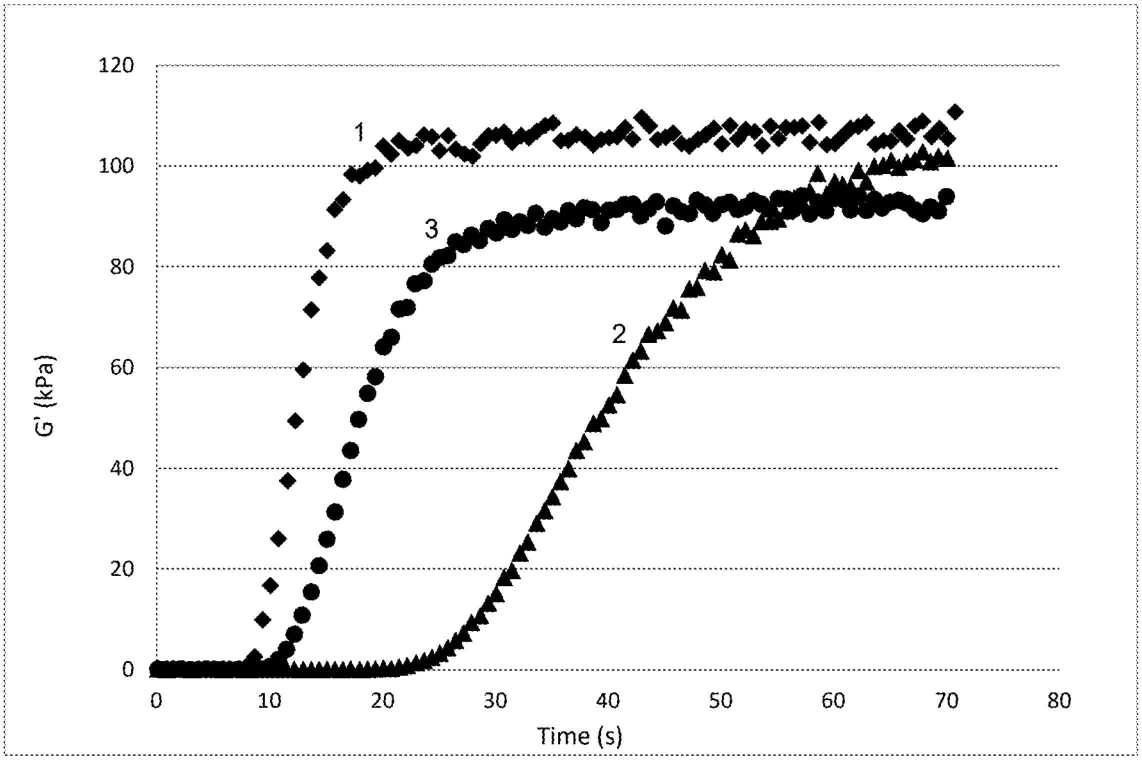
FIG. 1 shows photo-rheology studies of polymerizable compositions each with visible light photoinitiator: 1-0.6% Ge-PI, 450 nm LED; 2-0.6% Ge-PI, 472 nm LED; 3-1.0% Sn—PI, 472 nm LED.

Unless defined otherwise, all technical and scientific terms used herein have the same meaning as commonly understood by one of ordinary skill in the art to which this invention belongs. Generally, the nomenclature used herein and the laboratory procedures are well known and commonly employed in the art. Conventional methods are used for these procedures, such as those provided in the art and various general references. Where a term is provided in the singular, the inventors also contemplate the plural of that term. The nomenclature used herein and the laboratory procedures described below are those well known and commonly employed in the art.

"About" as used herein means that a number referred to as "about" comprises the recited number plus or minus 1-10% of that recited number.

"Optional" or "optionally" means that the subsequently described event or circumstance can or cannot occur, and that the description includes instances where the event or circumstance occurs and instances where it does not.

An "ophthalmic lens" refers to a contact lens and/or an intraocular lens. A "contact Lens" refers to a structure that can be placed on or within a wearer's eye. A contact lens can correct, improve, or alter a user's eyesight, but that need not be the case. A "silicone hydrogel contact lens" refers to a contact lens comprising a silicone hydrogel material.

The term "anterior surface", "front surface", "front curve surface" or "FC surface" in reference to a contact lens interchangeably means a surface of the contact lens that faces away from the eye during wear and is substantially convex.

The "posterior surface", "back surface", "base curve surface" or "BC surface" in reference to a contact lens interchangeably means a surface of the contact lens that faces towards the eye during wear and is substantially concave.

A "hydrogel" or "hydrogel material" refers to a crosslinked polymeric material which has three-dimensional polymer networks (i.e., polymer matrix), is insoluble in water, but can hold at least 10% by weight of water in its polymer matrix when it is fully hydrated (or equilibrated).

A siloxane, which often also described as a silicone, refers to a molecule having at least one moiety of —Si—O—Si— where each Si atom carries two organic groups as substituents.

A "silicone hydrogel" or "SiHy" refers to a silicone-containing hydrogel obtained by copolymerization of a polymerizable composition comprising at least one silicone-containing monomer or at least one silicone-containing macromer or at least one crosslinkable silicone-containing prepolymer.

As used in this application, the term "non-silicone hydrogel" or "non-silicone hydrogel material" interchangeably refers to a hydrogel that is theoretically free of silicon.

The term "room temperature" refers to a temperature of about 22° C. to about 26° C.

The term "soluble", in reference to a compound or material in a solvent, means that the compound or material can be dissolved in the solvent to give a solution with a concentration of at least about 0.5% by weight at room temperature (i.e., from about 22° C. to about 26° C.).

The term "insoluble", in reference to a compound or material in a solvent, means that the compound or material can be dissolved in the solvent to give a solution with a concentration of less than 0.01% by weight at room temperature (as defined above).

A "vinylic monomer" refers to a compound that has one sole ethylenically unsaturated group, is soluble in a solvent, and can be polymerized actinically or thermally.

A "polymerizable material" refers to a compound, a polymer (soluble in a solvent), or a mixture thereof that comprises at least one ethylenically unsaturated group and can be polymerized actinically or thermally.

As used in this application, the term "ethylenically unsaturated group" is employed herein in a broad sense and is intended to encompass any groups containing at least one $>C=CH_2$ group. Exemplary ethylenically unsaturated groups include without limitation (meth)acryloyl

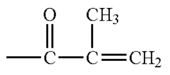 and/or 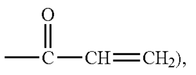

vinyloxycarbonylamino

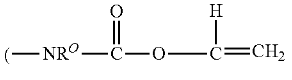

in which $R^o$ is H or $C_1$-$C_4$ alkyl), vinyloxycarbonyloxy

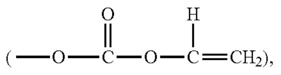

vinylaminocarbonylamino

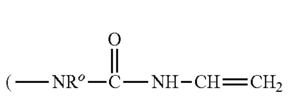

in which $R^o$ is H or $C_1$-$C_4$ alkyl), vinylaminocarbonyloxy

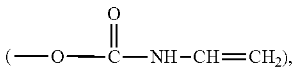

allyl, vinyl, styrenyl

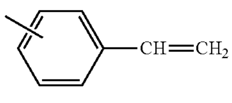 or 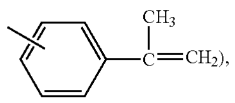

or other C=C containing groups.

An "acrylic monomer" refers to a vinylic monomer having one sole (meth)acryloyl group. Examples of acrylic monomrs includes (meth)acryloxy [or (meth)acryloyloxy] monomers and (meth)acrylamido monomers.

An "(meth)acryloxy monomer" or "(meth)acryloyloxy monomer" refers to a vinylic monomer having one sole group of

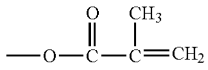 or 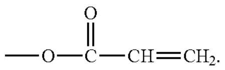

An "(meth)acrylamido monomer" or "(meth)acryloylamino monomer" refers to a vinylic monomer having one sole group of

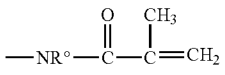 or 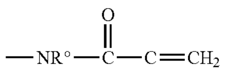

in which $R^o$ is H or $C_1$-$C_4$ alkyl.

An "N-vinyl amide monomer" refers to an amide compound having a vinyl group $-CH=CH_2)$ that is directly attached to the nitrogen atom of the amide group.

A "vinyloxycarbonyloxy monomer" refers to a vinylic monomer having one sole vinyloxycarbonyloxy group.

A "vinyloxycarbonylamino monomer" refers to a vinylic monomer having one sole vinyloxycarbonylamino group.

A "vinylaminocarbonyloxy monomer" refers to a vinylic monomer having one sole vinylaminocarbonyloxy group.

A "vinylaminocarbonylamino monomer" refers to a vinylic monomer having one sole vinylaminocarbonylamino group.

The term "(meth)acrylamide" refers to methacrylamide and/or acrylamide.

The term "(meth)acrylate" refers to methacrylate and/or acrylate.

The term "ene group" refers to a monovalent radical of $$CH_2{=}CH{-} \quad \text{or} \quad CH_2{=}CCH_3{-}$$

that is not covalently attached to an oxygen or nitrogen atom or a carbonyl group.

An "ene monomer" refers to a vinylic monomer having one sole ene group.

A "hydrophilic vinylic monomer" refers to a vinylic monomer which can be polymerized to form a homopolymer that is water-soluble or can absorb at least 10% by weight of water.

A "hydrophobic vinylic monomer" means a vinylic monomer which can be polymerized to form a homopolymer that is not water-soluble or can absorb less than 10% by weight of water.

As used in this application, the term "vinylic crosslinker" refers to an organic compound having at least two ethylenically unsaturated groups. A "vinylic crosslinking agent" refers to a vinylic crosslinker having a molecular weight of 700 Daltons or less.

A "blending vinylic monomer" refers to a vinylic monomer capable of dissolving both hydrophilic and hydrophobic components of a polymerizable composition to form a solution.

As used herein, "actinically" in reference to curing, crosslinking or polymerizing of a polymerizable composition, a prepolymer or a material means that the curing (e.g., crosslinked and/or polymerized) is performed by actinic irradiation, such as, for example, UV/visible irradiation, ionizing radiation (e.g. gamma ray or X-ray irradiation), microwave irradiation, and the like. Thermal curing or actinic curing methods are well-known to a person skilled in the art.

As used in this application, the term "polymer" means a material formed by polymerizing or crosslinking one or more monomers or macromers or prepolymers or combinations thereof.

A "macromer" or "prepolymer" refers to a compound or polymer that contains ethylenically unsaturated groups and has a number average molecular weight of greater than 700 Daltons.

As used in this application, the term "molecular weight" of a polymeric material (including monomeric or macromeric materials) refers to the number-average molecular weight unless otherwise specifically noted or unless testing conditions indicate otherwise. A skilled person knows how to determine the molecular weight of a polymer according to known methods, e.g., GPC (gel permeation chromatography) with one or more of a refractive index detector, a low-angle laser light scattering detector, a multi-angle laser light scattering detector, a differential viscometry detector, a UV detector, and an infrared (IR) detector; MALDI-TOF MS (matrix-assisted laser desorption/ionization time-of-flight mass spectroscopy); 1H NMR (Proton nuclear magnetic resonance) spectroscopy, etc.

A "polysiloxane vinylic monomer" or a "polysiloxane vinylic monomer" interchangeably refers to a compound comprising at least one polysiloxane segment and one sole ethylenically-unsaturated group.

A "polydiorganosiloxane vinylic crosslinker" or polysiloxane vinylic crosslinker" interchangeably refers to a compound comprising at least one polysiloxane segment and at least two ethylenically-unsaturated groups.

A "linear polydiorganosiloxane vinylic crosslinker" or "linear polysiloxane vinylic crosslinker" interchangeably refers to a compound comprising a main chain which includes at least one polysiloxane segment and is terminated with one ethylenically-unsaturated group at each of the two ends of the main chain.

A "chain-extended polydiorganosiloxane vinylic crosslinker" or "chain-extended polysiloxane vinylic crosslinker" interchangeably refers to a compound comprising at least two ethylenically-unsaturated groups and at least two polysiloxane segments each pair of which are linked by one divalent radical.

The term "fluid" as used herein indicates that a material is capable of flowing like a liquid.

As used in this application, the term "clear" in reference to a polymerizable composition means that the polymerizable composition is a transparent solution or liquid mixture (i.e., having a light transmissibility of 85% or greater in the range between 400 to 700 nm).

The term "monovalent radical" refers to an organic radical that is obtained by removing a hydrogen atom from an organic compound and that forms one bond with one other group in an organic compound. Examples include without limitation, alkyl (by removal of a hydrogen atom from an alkane), alkoxy (or alkoxyl) (by removal of one hydrogen atom from the hydroxyl group of an alkyl alcohol), thiyl (by removal of one hydrogen atom from the thiol group of an alkylthiol), cycloalkyl (by removal of a hydrogen atom from a cycloalkane), cycloheteroalkyl (by removal of a hydrogen atom from a cycloheteroalkane), aryl (by removal of a hydrogen atom from an aromatic ring of the aromatic hydrocarbon), heteroaryl (by removal of a hydrogen atom from any ring atom), amino (by removal of one hydrogen atom from an amine), etc.

The term "divalent radical" refers to an organic radical that is obtained by removing two hydrogen atoms from an organic compound and that forms two bonds with other two groups in an organic compound. For example, an alkylene divalent radical (i.e., alkylenyl) is obtained by removal of two hydrogen atoms from an alkane, a cycloalkylene divalent radical (i.e., cycloalkylenyl) is obtained by removal of two hydrogen atoms from the cyclic ring.

In this application, the term "substituted" in reference to an alkyl or an alkylenyl means that the alkyl or the alkylenyl comprises at least one substituent which replaces one hydrogen atom of the alkyl or the alkylenyl and is selected from the group consisting of hydroxyl (—OH), carboxyl (—COOH), —$NH_2$, sulfhydryl (—SH), $C_1$-$C_4$ alkyl, $C_1$-$C_4$ alkoxy, $C_1$-$C_4$ alkylthio (alkyl sulfide), $C_1$-$C_4$ acylamino, $C_1$-$C_4$ alkylamino, di-$C_1$-$C_4$ alkylamino, and combinations thereof.

A "photoinitiator" refers to a chemical that initiates free radical crosslinking/polymerizing reaction by the use of light.

The term "acyltin photoinitiator" refers to an organotin compound that is a tin-based Norrish Type I photoinitiator and comprises at least one arylcarbonyl group connected to tin. Examples of such acyltin photoinitiators are described in U.S. patent Ser. No. 11/142,592.

The "oxygen transmissibility", Dk/t, of an insert or material is the rate at which oxygen will pass through a specific insert or material with an average thickness of t [in units of mm] over the area being measured. Oxygen transmissibility is conventionally expressed in units of barrers/mm, where "barrers/mm" is defined as [($cm^3$ oxygen)/($cm^2$)(sec) (mm Hg)]$\times 10^{-9}$.

The term "modulus" or "elastic modulus" in reference to a contact lens or a material means the tensile modulus or Young's modulus which is a measure of the stiffness of a contact lens or a material and can be measured according to the procedures described in Example 1.

"UVA" refers to radiation occurring at wavelengths between 315 and 380 nanometers; "UVB" refers to radiation occurring between 280 and 315 nanometers; "Violet" refers to radiation occurring at wavelengths between 380 and 440 nanometers.

"UVA transmittance" (or "UVA % T"), "UVB transmittance" or "UVB % T", and "violet-transmittance" or "Violet % T" are calculated by the following formula.

UVA % T=Average % Transmission between 315 nm and 380 nm×100

UVB % T=Average % Transmission between 280 nm and 315 nm×100

Violet % T=Average % Transmission between 380 nm and 440 nm×100

A "polymerizable UV-absorbing compound" refers to a compound that is soluble in a solvent and comprises an ethylenically-unsaturated group and a UV-absorbing moiety which can absorb or screen out UV radiation in the range from 200 nm to 400 nm as understood by a person skilled in the art.

A "polymerizable HEVL-absorbing compound" refers to a compound that is soluble in a solvent and comprises an ethylenically-unsaturated group and a HEVL-absorbing moiety which can absorb or screen out HEVL (high-energy-violet-light) radiation in the range from 380 nm to 440 nm as understood by a person skilled in the art.

A "spatial limitation of actinic radiation" refers to an act or process in which energy radiation in the form of rays is directed by, for example, a mask or screen or combinations thereof, to impinge, in a spatially restricted manner, onto an area having a defined peripheral boundary. A spatial limitation of UV radiation is obtained by using a mask or screen having a radiation (e.g., UV and/or visible light) permeable region, a radiation (e.g., UV and/or visible light) impermeable region surrounding the radiation-permeable region, and a projection contour which is the boundary between the radiation-impermeable and radiation-permeable regions, as schematically illustrated in the drawings of U.S. Pat. No. 6,800,225 (FIGS. 1-11), and U.S. Pat. No. 6,627,124 (FIGS. 1-9), U.S. Pat. No. 7,384,590 (FIGS. 1-6), and U.S. Pat. No. 7,387,759 (FIGS. 1-6). The mask or screen allows to spatially projects a beam of radiation (e.g., UV radiation and/or visible radiation) having a cross-sectional profile defined by the projection contour of the mask or screen. The projected beam of radiation (e.g., UV radiation and/or visible radiation) limits radiation impinging on a lens formulation located in the path of the projected beam from the first molding surface to the second molding surface of a mold. The resultant contact lens comprises an anterior surface defined by the first molding surface, an opposite posterior surface defined by the second molding surface, and a lens edge defined by the sectional profile of the projected UV and/or visible beam (i.e., a spatial limitation of radiation). The radiation used for the crosslinking is radiation energy, especially UV radiation (and/or visible radiation), gamma radiation, electron radiation or thermal radiation, the radiation energy preferably being in the form of a substantially parallel beam in order on the one hand to achieve good restriction and on the other hand efficient use of the energy.

The term "curing time" in reference to a polymerizable composition means a time required for the measured elastic modulus (G') to reach a plateau in the photo-rheology study in which the polymerizable composition is placed between a quartz plate that allows actinic radiation (e.g., a visible light with a spectral centroid of about 472 nm and a total irradiance of about 55 mW/$cm^2$) to pass through and a rheometer.

A "coating" in reference to a contact lens means that the contact lens has, on its surfaces, a thin layer of a material that is different from the bulk material of the contact lens and obtained by subjecting the contact lens to a surface treatment.

"Surface modification" or "surface treatment", as used herein, means that an article has been treated in a surface treatment process, in which (1) a coating is applied to the surface of the article, (2) chemical species are adsorbed onto the surface of the article, (3) the chemical nature (e.g., electrostatic charge) of chemical groups on the surface of the article are altered, or (4) the surface properties of the article are otherwise modified. Exemplary surface treatment processes include, but are not limited to, a surface treatment by energy (e.g., a plasma, a static electrical charge, irradiation, or other energy source), chemical treatments, the grafting of hydrophilic vinylic monomers or macromers onto the surface of an article, mold-transfer coating process disclosed in U.S. Pat. No. 6,719,929, the incorporation of wetting agents into a lens formulation for making contact lenses proposed in U.S. Pat. Nos. 6,367,929 and 6,822,016, reinforced mold-transfer coating disclosed in U.S. Pat. No. 7,858,000, and a hydrophilic coating composed of covalent attachment or physical deposition of one or more layers of one or more hydrophilic polymer onto the surface of a contact lens disclosed in U.S. Pat. Nos. 8,147,897, 8,409,599, 8,557,334, 8,529,057, and 9,505,184.

A "hydrophilic surface" in reference to a SiHy material or a contact lens means that the SiHy material or the contact lens has a surface hydrophilicity characterized by having an averaged water contact angle of about 90 degrees or less, preferably about 80 degrees or less, more preferably about 70 degrees or less, more preferably about 60 degrees or less.

An "average contact angle" refers to a water contact angle (static water contact angle measured by Sessile Drop), which is obtained by averaging measurements of at least 3 individual contact lenses.

In general, the invention is directed to a method for making UV- and HEVL-absorbing silicone hydrogel contact lenses by photocuring of a lens-forming composition in the presence of an acyltin photoinitiator and with radiation of a visible light with a wavelength greater than 45 nm (e.g., 472 nm). The invention is particularly directed to a method for making UV- and HEVL-absorbing silicone hydrogel contact lenses based on the Lightstream Technology™. The invention is partly based on the discovery that by selecting the combination of a UV-absorbing vinylic monomer, a HEVL-absorbing vinylic monomer, an acyltin photoinitiator, and polymerizable materiasls (e.g., (meth)acrylamide-type monomers and/or macromers) in preparing a lens-forming composition for making UV- and HEVL-absorbing silicone hydrogel contact lenses as well as a visible radiation with a relatively longer wavelength (e.g., 472 nm) as curing radiation source, the curing time of the mixture in a mold can be adequately short so as to make the lens-forming composition suitable for making UV- and HEVL-absorbing silicone hydrogel contact lenses based on the Lightstream Technology™.

The relatively-short curing time involved in the invention can ensure that contact lenses with high quality lens edge are produced at a lower cost. It is believed that a relatively longer curing time may adversely affect the quality of lens edge of contact lenses made according to the Lightstream Technology™ and can increase the product cost by lowering the production output. Although one might be able to shorten the curing time of a lens-forming composition by increasing the curing light intensity and/or the concentration of a photoinitiator in the lens-forming composition, the high curing light intensity and high photoinitiator concentration have limits and may not be sufficient to reduce the curing time enough for the Lightstream Technology™. Further, these measures may cause resultant lenses with undesirable physical properties, such as, for example, fragile and high content of extractable due to unpolymerized monomers. In addition, ineffective or uneven photo-polymerization of the lens forming composition due to the presence of a UV-absorber and a HEVL-absorber may be minimized or eliminated. With a lens-forming composition of the invention, a curing time of about 60 seconds, for example, can be achieved with a 472 nm LCD light source (e.g., a curing light intensity of about 55 $mW/cm^2$). UV- and HEVL-absorbing silicone hydrogel contact lenses made from such a lens-forming composition according to the Lightstream Technology can have high lens edge quality and relatively low lens production cost because of the relatively short curing time. Second, a UV-absorber and HEVL-absorber may result in ineffective or uneven photo-polymerization of the lens forming composition.

In one aspect, the invention provides a method for producing UV-absorbing silicone hydrogel contact lenses, the method comprising the steps of: (1) providing a mold for making a soft contact lens, wherein the mold has a first mold half with a first molding surface defining the anterior surface of a contact lens and a second mold half with a second molding surface defining the posterior surface of the contact lens, wherein said first and second mold halves are configured to receive each other such that a cavity is formed between said first and second molding surfaces; (2) introducing a lens-forming composition into the cavity, wherein the lens-forming composition comprises (i) at least one hydrophilic vinylic monomer, (ii) at least one siloxane-containing vinylic monomer and/or at least one polysiloxane vinylic crosslinker, (iii) at least one polymerizable UV-absorbing compound and at least one polymerizable HEVL-absorbing compound in amounts sufficient to provide the lens-forming composition with an average UVB transmittance of about 10% or less (preferably about 5% or less, more preferably about 2.5% or less, even more preferably about 1% or less) between 280 and 315 nanometers, an average UVA transmittance of about 30% or less (preferably about 20% or less, more preferably about 10% or less, even more preferably about 5% or less) between 315 and 380 nanometers, and an average Violet transmittance of about 70% or less (preferably about 60% or less, more preferably about 50% or less, even more preferably about 40% or less) between 380 nm and 440 nm, and (iv) from about 0.05% to about 1.5% by weight of at least one acyltin photoinitiator capable of initiating a free-radical polymerization under irradiation with a light source including a light in the region of from 455 nm to 510 nm; and (3) irradiating (preferably under a spatial limitation of actinic radiation) the lens-forming composition in the mold by using the light source including a light in a region of from 455 nm to 510 nm, so as to form the UV- and HEVL-absorbing silicone hydrogel contact lens, wherein the formed UV-absorbing silicone hydrogel contact lens has a UVB transmittance of about 10% or less (preferably about 5% or less, more preferably about 2.5% or less, even more preferably about 1% or less) between 280 and 315 nanometers and a UVA transmittance of about 30% or less (preferably about 20% or less, more preferably about 10% or less, even more preferably about 5% or less) between 315 and 380 nanometers and and (c) the Violet transmittance of about 70% or less (preferably about 60% or less, more preferably about 50% or less, even more preferably about 40% or less) between 380 nm and 440 nm.

Lens molds for making contact lenses are well known to a person skilled in the art. Methods of manufacturing mold sections for cast-molding a contact lens are generally well known to those of ordinary skill in the art. The process of the present invention is not limited to any particular method of forming a mold. In fact, any method of forming a mold can be used in the present invention. The first and second mold halves can be formed through various techniques, such as injection molding or lathing. Examples of suitable processes for forming the mold halves are disclosed in U.S. Pat. Nos. 4,444,711, 4,460,534, 5,843,346, and 5,894,002. Virtually all materials known in the art for making molds can be used to make molds for making contact lenses. For example, polymeric materials, such as polyethylene, polypropylene, polystyrene, PMMA, Topas® COC grade 8007-S10 (clear amorphous copolymer of ethylene and norbornene, from Ticona GmbH of Frankfurt, Germany and Summit, New Jersey), or the like can be used. Other materials that allow UV light transmission could be used, such as quartz glass and sapphire.

Preferably, a reusable mold suitable for spatial limitation of radiation is used in the invention, the projected beam of radiation (e.g., radiation from the light source including the light in the region of 420 nm to 550 nm) limits radiation (e.g., UV radiation) impinging on the mixture of the lens-forming materials located in the path of the projected beam from the first molding surface to the second molding surface of the reusable mold. The resultant contact lens comprises an anterior surface defined by the first molding surface, an opposite posterior surface defined by the second molding surface, and a lens edge (with sharp edge and high quality) defined by the sectional profile of the projected radiation beam (i.e., a spatial limitation of radiation). Examples of reusable molds suitable for spatial limitation of radiation include without limitation those disclosed in U.S. Pat. Nos. 6,627,124, 6,800,225, 7,384,590, and 7,387,759.

For example, a preferred reusable mold comprises a first mold half having a first molding surface and a second mold half having a second molding surface. The two mold halves of the preferred reusable mold are not touching each other, but there is a thin gap of annular design arranged between the two mold halves. The gap is connected to the mold cavity formed between the first and second molding surfaces, so that excess mixture can flow into the gap. It is understood that gaps with any design can be used in the invention.

In a preferred embodiment, at least one of the first and second molding surfaces is permeable to a crosslinking radiation. More preferably, one of the first and second molding surfaces is permeable to a crosslinking radiation while the other molding surface is poorly permeable to the crosslinking radiation.

The reusable mold preferably comprises a mask which is fixed, constructed or arranged in, at or on the mold half having the radiation-permeable molding surface. The mask is impermeable or at least of poor permeability compared with the permeability of the radiation-permeable molding surface. The mask extends inwardly right up to the mold cavity and surrounds the mold cavity to screen all areas behind the mask excepting the mold cavity.

The mask may preferably be a thin chromium layer, which can be produced according to processes as known, for example, in photo and UV lithography. Other metals or metal oxides may also be suitable mask materials. The mask can also be coated with a protective layer, for example of silicon dioxide if the material used for the mold or mold half is quartz.

Alternatively, the mask can be a masking collar made of a material comprising a UV-absorber and substantially blocks curing energy therethrough as described in U.S. Pat. No. 7,387,759. In this preferred embodiment, the mold half with the mask comprises a generally circular disc-shaped transmissive portion and a masking collar having an inner diameter adapted to fit in close engagement with the transmissive portion, wherein said transmissive portion is made from an optically clear material and allows passage of curing energy therethrough, and wherein the masking collar is made from a material comprising a light-blocker and substantially blocks passage of curing energy therethrough, wherein the masking collar generally resembles a washer or a doughnut, with a center hole for receiving the transmissive portion, wherein the transmissive portion is pressed into the center opening of the masking collar and the masking collar is mounted within a bushing sleeve.

Reusable molds can be made of quartz, glass, sapphire, $CaF_2$, a cyclic olefin copolymer (such as for example, Topas® COC grade 8007-S10 (clear amorphous copolymer of ethylene and norbornene) from Ticona GmbH of Frankfurt, Germany and Summit, New Jersey, Zeonex® and Zeonor® from Zeon Chemicals LP, Louisville, KY), polymethylmethacrylate (PMMA), polyoxymethylene from DuPont (Delrin), Ultem® (polyetherimide) from G.E. Plastics, PrimoSpire®, etc., Because of the reusability of the mold halves, a relatively high outlay can be expended at the time of their production in order to obtain molds of extremely high precision and reproducibility. Since the mold halves do not touch each other in the region of the lens to be produced, i.e., the cavity or actual molding surfaces, damage as a result of contact is ruled out. This ensures a high service life of the molds, which, in particular, also ensures high reproducibility of the contact lenses to be produced and high fidelity to the lens design.

Any hydrophilic vinylic monomer can be used in the invention. Examples of preferred hydrophilic vinylic monomers are hydrophilic (meth)acrylamido monomer (as described later in this application), hydrophilic (meth)acryloxy monomer (as described later in this application), hydrophilic N-vinyl amide monomer (as described later in this application), methylene-containing pyrrolidone monomers (i.e., pyrrolidone derivatives each having a methylene group connected to the pyrrolidone ring at 3- or 5-position) (as described later in this application), vinyl ether monomers (as described later in this application), allyl ether monomers (as described later in this application), phosphorylcholine-containing vinylic monomers (as described later in this application), allyl alcohol, N-2-hydroxyethyl vinyl carbamate, N-vinyloxycarbonyl-β-alanine (VINAL), N-vinyloxycarbonyl-α-alanine, and combinations thereof.

Any siloxane-containing vinylic monomer can be used in the invention. Examples of preferred siloxane-containing vinylic monomers can be siloxane-containing (meth)acrylamido monomers, siloxane-containing (meth)acryloxy monomers, siloxane-containing vinyloxy-carbonyloxy monomers, siloxane-containing vinyloxycarbonylamino monomers, siloxane-containing vinylaminocarbonylamino monomers, or siloxane-containing vinylaminocarbonyloxy monomers, each of which comprises a bis(trialkylsilyloxy)alkylsilyl group, a tris(trialkylsilyloxy)-silyl group, or a polysiloxane chain having 2 to 30 siloxane units and terminated with an alkyl, hydroxyalkyl or methoxyalkyl group. Such preferred siloxane-containing vinylic monomers can be obtained from the commercial suppliers, or alternatively prepared according to known procedures, e.g., similar to those described in U.S. Pat. Nos. 5,070,215, 6,166,236, 6,867,245, 7,214,809, 8,415,405, 8,475,529, 8,614,261, 8,658,748, 9,097,840, 9,103,965, 9,217,813, 9,315,669, and 9,475,827, or by reacting a vinylic monomer having a reactive functional group (e.g., an acid chloride, acid anhydride, carboxyl, hydroxyl, amino, epoxy, isocyanate, aziridine, azlactone, or aldehyde group) with a siloxane-containing compound having a reactive group selected from the group consisting of a hydroxyalkyl, an aminoalkyl, an alkylaminoalkyl, a carboxyalkyl, an isocyanatoalkyl, an epoxyalkyl, and an aziridinylalkyl, in the presence or absence of a coupling agent under coupling reaction conditions well known to a person skilled in the art.

In accordance with the invention, any polysiloxane vinylic crosslinkers can be used in this invention. Examples of preferred polysiloxane vinylic crosslinkers include without limitation α,ω-(meth)acryloxy-terminated polydimethylsiloxanes of various molecular weight; α,ω-(meth)acrylamido-terminated polydimethylsiloxanes of various molecular weight; α,ω-vinyl carbonate-terminated polydimethylsiloxanes of various molecular weight; α,ω-vinyl carbamate-terminated polydimethylsiloxane of various molecular weight; bis-3-methacryloxy-2-hydroxy-propyloxypropyl polydimethylsiloxane of various molecular weight; N,N,N',N'-tetrakis(3-methacryloxy-2-hydroxypropyl)-alpha,omega-bis-3-aminopropyl-polydimethylsiloxane of various molecular weight; the reaction products of glycidyl methacrylate with amino-functional polydimethylsiloxanes; the reaction products of an azlactone-containing vinylic monomer (any one of those described above) with hydroxyl-functional polydimethylsiloxanes; polysiloxane-containing macromer selected from the group consisting of Macromer A, Macromer B, Macromer C, and Macromer D described in U.S. Pat. No. 5,760,100; polysiloxane vinylic crosslinkers disclosed in U.S. Pat. Nos. 4,136,250, 4,153,641, 4,182,822, 4,189,546, 4,259,467, 4,260,725, 4,261,875, 4,343,927, 4,254,248, 4,355,147, 4,276,402, 4,327,203, 4,341,889, 4,486,577, 4,543,398, 4,605,712, 4,661,575, 4,684,538, 4,703,097, 4,833,218, 4,837,289, 4,954,586, 4,954,587, 5,010,141, 5,034,461, 5,070,170, 5,079,319, 5,039,761, 5,346,946, 5,358,995, 5,387,632, 5,416,132, 5,449,729, 5,451,617, 5,486,579, 5,962,548, 5,981,675, 6,039,913, 6,762,264, 7,423,074, 8,163,206, 8,480,227, 8,529,057, 8,835,525, 8,993,651, 9,187,601, 10,081,697, 10,301,451, and 10,465,047.

One class of preferred polysiloxane vinylic crosslinkers are di-(meth)acryloyloxy-terminated polysiloxane vinylic crosslinkers each having dimethylsiloxane units and hydrophilized siloxane units each having one methyl substituent and one monovalent $C_4$-$C_{40}$ organic radical substituent having 2 to 6 hydroxyl groups, more preferably a polysiloxane vinylic crosslinker of formula (H), are described later in this application and can be prepared according to the procedures disclosed in U.S. Pat. No. 10,081,697.

Another class of preferred polysiloxane vinylic crosslinkers are vinylic crosslinkers each of which comprises one sole polysiloxane segment and two terminal (meth)acryloyl groups, which can be obtained from commercial suppliers; prepared by reacting glycidyl (meth)acrylate (meth)acryloyl chloride with a di-amino-terminated polydimethylsiloxane or a di-hydroxyl-terminated polydimethylsiloxane; prepared by reacting isocyantoethyl (meth)acrylate with di-hydroxyl-terminated polydimethylsiloxanes prepared by reacting an amino-containing acrylic monomer with di-carboxyl-terminated polydimethylsiloxane in the presence of a coupling agent (a carbodiimide); prepared by reacting a carboxyl-containing acrylic monomer with di-amino-terminated polydimethylsiloxane in the presence of a coupling agent (a carbodiimide); or prepared by reacting a hydroxyl-containing acrylic monomer with a dihydroxy-terminated polydimethylsiloxane in the presence of a diisocyanate or diepoxy coupling agent.

Other classes of preferred polysiloxane vinylic crosslinkers are chain-extended polysiloxane vinylic crosslinkers each of which has at least two polysiloxane segments linked by a linker between each pair of polysiloxane segments and two terminal ethylenically unsaturated groups, which can be prepared according to the procedures described in U.S. Pat. Nos. 5,034,461, 5,416,132, 5,449,729, 5,760,100, 7,423,074, 8,529,057, 8,835,525, 8,993,651, 9,187,601, 10,301,451, and 10,465,047.

Any suitable polymerizable UV-absorbing compounds and polymerizable UV/HEVL-absorbing compounds can be used in a lens-forming composition for preparing a SiHy contact lens of the invention. Examples of preferred polymerizable UV-absorbing and UV/HEVL-absorbing compounds include without limitation: 2-(2-hydroxy-5-vinylphenyl)-2H-benzotriazole, 2-(2-hydroxy-5-acrylyloxyphenyl)-2H-benzotriazole, 2-(2-hydroxy-3-methacrylamido methyl-5-tert octylphenyl)benzotriazole, 2-(2'-hydroxy-5'-methacrylamidophenyl)-5-chlorobenzotriazole, 2-(2'-hydroxy-5'-methacrylamidophenyl)-5-methoxybenzotriazole, 2-(2'-hydroxy-5'-methacryloxy-propyl-3'-t-butyl-phenyl)-5-chlorobenzotriazole, 2-(2'-hydroxy-5'-methacryloxypropylphenyl)benzotriazole, 2-hydroxy-5-methoxy-3-(5-(trifluoromethyl)-2H-benzo[d][1,2,3]triazol-2-yl)benzyl methacrylate (WL-1), 2-hydroxy-5-methoxy-3-(5-methoxy-2H-benzo[d][1,2,3]triazol-2-yl)benzyl methacrylate (WL-5), 3-(5-fluoro-2H-benzo[d][1,2,3]triazol-2-yl)-2-hydroxy-5-methoxybenzyl methacrylate (WL-2), 3-(2H-benzo[d][1,2,3]triazol-2-yl)-2-hydroxy-5-methoxybenzyl methacrylate (WL-3), 3-(5-chloro-2H-benzo[d][1,2,3]triazol-2-yl)-2-hydroxy-5-methoxybenzyl methacrylate (WL-4), 2-hydroxy-5-methoxy-3-(5-methyl-2H-benzo[d][1,2,3]triazol-2-yl)benzyl methacrylate (WL-6), 2-hydroxy-5-methyl-3-(5-(trifluoromethyl)-2H-benzo[d][1,2,3]triazol-2-yl)benzyl methacrylate (WL-7), 4-allyl-2-(5-chloro-2H-benzo[d][1,2,3]triazol-2-yl)-6-methoxyphenol (WL-8), 2-{2'-Hydroxy-3'-tert-5' [3"-(4"-vinylbenzyloxy) propoxy]phenyl}-5-methoxy-2H-benzotriazole, phenol, 2-(5-chloro-2H-benzotriazol-2-yl)-6-(1,1-dimethylethyl)-4-ethenyl-(UVAM), 2-[2'-hydroxy-5'-(2-methacryloxyethyl)phenyl)]-2H-benzotriazole (2-Propenoic acid, 2-methyl-, 2-[3-(2H-benzotriazol-2-yl)-4-hydroxyphenyl]ethyl ester, Norbloc), 2-{2'-Hydroxy-3'-tert-butyl-5'-[3'-methacryloyloxypropoxy]phenyl}-2H-benzotriazole, 2-{2'-Hydroxy-3'-tert-butyl-5'-[3'-methacryloyloxypropoxy]phenyl}-5-methoxy-2H-benzotriazole (UV13), 2-{2'-Hydroxy-3'-tert-butyl-5'-[3'-methacryloyloxypropoxy]phenyl}-5-chloro-2H-benzotriazole (UV28), 2-[2'-Hydroxy-3'-tert-butyl-5'-(3'-acryloyloxypropoxy)phenyl]-5-trifluoromethyl-2H-benzotriazole (UV23), 2-(2'-hydroxy-5-methacrylamidophenyl)-5-methoxybenzotriazole (UV6), 2-(3-allyl-2-hydroxy-5-methylphenyl)-2H-benzotriazole (UV9), 2-(2-Hydroxy-3-methallyl-5-methylphenyl)-2H-benzotriazole (UV12), 2-3'-t-butyl-2'-hydroxy-5'-(3"-dimethylvinylsilylpropoxy)-2'-hydroxy-phenyl)-5-methoxybenzotriazole (UV15), 2-(2'-hydroxy-5'-methacryloylpropyl-3'-tert-butyl-phenyl)-5-methoxy-2H-benzotriazole (UV16), 2-(2'-hydroxy-5'-acryloylpropyl-3'-tert-butyl-phenyl)-5-methoxy-2H-benzotriazole (UV16A), 2-Methylacrylic acid 3-[3-tert-butyl-5-(5-chloro-benzotriazol-2-yl)-4-hydroxy-phenyl]-propyl ester (16-100, CAS #96478-15-8), 2-(3-(tert-butyl)-4-hydroxy-5-(5-methoxy-2H-benzo[d][1,2,3]triazol-2-yl) phenoxy)ethyl methacrylate (16-102); Phenol, 2-(5-chloro-2H-benzotriazol-2-yl)-6-methoxy-4-(2-propen-1-yl) (CAS #1260141-20-5); 2-[2-Hydroxy-5-[3-(methacryloyloxy) propyl]-3-tert-butylphenyl]-5-chloro-2H-benzotriazole; Phenol, 2-(5-ethenyl-2H-benzotriazol-2-yl)-4-methyl-, homopolymer (9CI) (CAS #83063-87-0); soluble polymerizable Cu (II)-porphyrins. In accordance with the invention, the polymerizable composition comprises about 0.1% to about 3.0%, preferably about 0.2% to about 2.5%, more preferably about 0.3% to about 2.0%, by weight of one or more UV-absorbing vinylic monomers, related to the amount of all polymerizable components in the polymerizable composition.

In a preferred embodiment, the lens-forming composition comprises 2-[2'-hydroxy-5'-(2-methacryloxyethyl)phenyl)]-2H-benzotriazole (Norbloc) (i.e., a UV-absorbing vinylic monomer), and at least one polymerizable HEVL-absorbing compound which is 2-{2'-Hydroxy-3'-tert-butyl-5'-[3'-methacryloyloxypropoxy]phenyl}-2H-benzotriazole, 2-{2'-Hydroxy-3'-tert-butyl-5'-[3'-methacryloyloxypropoxy]phenyl}-5-methoxy-2H-benzotriazole (UV13), 2-{2'-Hydroxy-3'-tert-butyl-5'-[3'-methacryloyloxypropoxy]phenyl}-5-chloro-2H-benzotriazole (UV28), 2-[2'-Hydroxy-3'-tert-butyl-5'-(3'-acryloyloxypropoxy)phenyl]-5-trifluoromethyl-2H-benzotriazole (UV23), a soluble polymerizable Cu (II)-porphyrin, or combinations thereof.

It is understood that the amounts of said at least one polymerizable UV-absorbing compound and said at least one polymerizable HEVL-absorbing compound in the lens-forming composition are sufficient to render a contact lens, which is obtained from the curing of the lens-forming composition, an ability of blocking or absorbing (i.e., the inverse of transmittance) at least 90% (preferably at least about 95%, more preferably at least about 97.5%, even more preferably at least about 99%) of UVB (between 280 and 315 nanometers), at least 70% (preferably at least about 80%, more preferably at least about 90%, even more preferably at least about 95%) of UVA transmittance (between 315 and 380 nanometers), and optionally (but preferably) at least 30% (preferably at least about 40%, more preferably at least about 50%, even more preferably at least about 60%) of violet light between 380 nm and 440 nm, which impinge on the lens.

Any acyltin photoinitiators can be used in this invention, so long as they are capable of initiating a free-radical polymerization under irradiation with a light source including a light in the region of about 455 to about 510 nm. Examples of acyltin photoinitiators are acyltin compounds described in U.S. patent Ser. No. 11/142,592. Preferably, the lens-forming composition comprises tetrakis(2,4,6-trimethylbenzoyl) stannane.

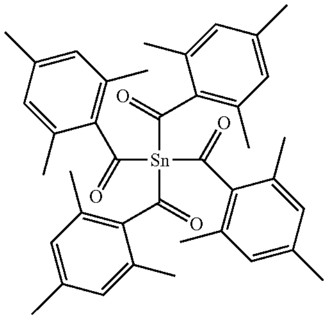

In a preferred embodiment, the lens-forming composition comprises (i)(a) at least one hydrophilic (meth)acrylamido monomer, (ii)(a) at least one siloxane-containing (meth) acrylamido monomer, (ii)(b) at least one polysiloxane vinylic crosslinker, (iii) said at least one polymerizable UV-absorbing compound and said at least one polymerizable HEVL-absorbing compound, and (iv) from about 0.05% to about 1.5% by weight of at least one an acyltin photoinitiator capable of initiating a free-radical polymerization under irradiation with a light source including a light in the region of about 455 to about 510 nm, wherein the sum of the amounts of components (i)(a), (ii)(a), (ii)(b), (iii) and (iv) is at least 90% by weight relative to total amount of all polymerizable components in the lens-forming composition, wherein the lens-forming composition has a curing time of about 60 seconds or less as determined in photo-rheology study using a LED light source which provide a visible light with a spectral centroid of about 472 nm and a total irradiance of about 55 $mW/cm^2$.

In accordance this preferred embodiment, any hydrophilic (meth)acrylamido monomers can be in this invention. Examples of preferred hydrophilic (meth)acrylamido monomers are described later in this application. It is understood that any hydrophilic (meth)acrylamido monomers other than those specifically described later in this application can also be used.

In accordance this preferred embodiment, any siloxane-containing (meth)acrylamido monomers can be used in the invention. Preferably, siloxane-containing (meth)acrylamido monomers are those (meth)acrylamido monomers each of which comprises a bis(trialkylsilyloxy)alkylsilyl group, a tris(trialkylsilyloxy)-silyl group, or a polysiloxane chain having 2 to 30 siloxane units and terminated with an alkyl, hydroxyalkyl or methoxyalkyl group, as described later in this application. Such preferred siloxane-containing (meth)acrylamido monomers can be obtained from the commercial suppliers, or alternatively prepared according to known procedures, e.g., similar to those described in U.S. Pat. No. 9,315,669.

Any polysiloxane vinylic crosslinkers described above can be used in this preferred embodiment of the invention.

In accordance with the this preferred embodiment, the polymerizable composition can also comprise additional polymerizable components selected from the group consisting of one or more secondary hydrophilic vinylic monomers (i.e., hydrophilic vinylic monomers other than hydrophilic (meth)acrylamido monomer as described above or later in this application), one or more secondary siloxane-containing vinylic monomers (i.e., siloxane-containing vinylic monomers other than siloxane-containing (meth)acrylamido monomer as described above or later in this application), one or more hydrophobic vinylic monomers (any one of those described later in this application, one or more non-silicone vinylic crosslinkers (any one of those described later in this application), and combinations thereof. It is understood that if the other polymerizable components are present in the polymerizable composition, their total amount is about 10% or less by weight (preferably about 7% or less by weight, more preferably about 4% or less by weight, even more preferably about 2% or less by weight) relative the total amount of all polymerizable component in the polymerizable composition.

Any hydrophobic vinylic monomers can be in this invention. Examples of preferred hydrophobic vinylic monomers include methyl(meth)acrylate, ethyl(meth)acrylate, propyl (meth)acrylate, isopropyl(meth)acrylate, cyclohexyl(meth) acrylate, 2-ethylhexyl(meth)acrylate, vinyl acetate, vinyl propionate, vinyl butyrate, vinyl valerate, styrene, chloroprene, vinyl chloride, vinylidene chloride, (meth)acrylonitrile, 1-butene, butadiene, vinyl toluene, vinyl ethyl ether, perfluorohexylethyl-thio-carbonyl-aminoethyl-methacrylate, isobornyl(meth)acrylate, trifluoroethyl(meth)acrylate, hexafluoro-isopropyl(meth)acrylate, hexafluorobutyl(meth) acrylate, and combinations thereof.

In accordance with the invention, any non-silicone vinylic crosslinkers can be in this invention. Examples of preferred non-silicone vinylic cross-linking agents are described later in this application.

A lens-forming composition of the invention can further comprise visibility tinting agents (e.g., D&C Blue No. 6, D&C Green No. 6, D&C Violet No. 2, carbazole violet, certain copper complexes, certain chromium oxides, various iron oxides, phthalocyanine green, phthalocyanine blue, titanium dioxides, or mixtures thereof), antimicrobial agents (e.g., silver nanoparticles), a bioactive agent (e.g., a drug, an amino acid, a polypeptide, a protein, a nucleic acid, 2-pyrrolidone-5-carboxylic acid (PCA), an alpha hydroxyl acid, linoleic and gamma linoleic acids, vitamins, or any combination thereof), leachable lubricants (e.g., a non-crosslinkable hydrophilic polymer having an average molecular weight from 5,000 to 500,000, preferably from 10,000 to 300,000, more preferably from 20,000 to 100,000 Daltons), leachable tear-stabilizing agents (e.g., a phospholipid, a monoglyceride, a diglyceride, a triglyceride, a glycolipid, a glyceroglycolipid, a sphingolipid, a sphingo-glycolipid, a fatty acid having 8 to 36 carbon atoms, a fatty alcohol having 8 to 36 carbon atoms, or a mixture thereof), and the like, as known to a person skilled in the art.

A lens-forming composition can also comprise at least one photochromic compound.

The term "photochromic compound" refers to a compound that has one colorless (or light-colored) form and one colored form and can undergo reversible change from the colorless form (or light-colored form) (or so-called "deactivated form" to the colored form (or so-called "activated form") upon exposure to UV or HEVL irradiation.

Any photochromic compounds can be used in the invention. Various photochromic compounds are disclosed in the patents and published patent applications and can be obtained from commercial sources or prepared by following the procedures described in the patents and literatures. Examples of preferred photochromic compounds include without limitation naphthopyrans, indeno-fused naphthopyrans (i.e., indeno-naphthopyrans), heterocyclic ring-fused naphthopyrians, benzopyrans, phenanthropyrans, quinopyrans, quinolinopyrans, fluoroanthenopyrans, anthracene-fused pyrans, tetracene-fused pyrans, spiro(benzindoline)-naphthopyrans, spiro(indoline) naphthopyrans, spiro (indoline) benzopyrans, spiro(indoline)-quinopyrans, spiro (indoline) pyrans, naphthoxazines, spirobenzopyrans, spirobenzothiopyrans, naphthacenediones, benzoxazines, spirooxazines, naphthoxazines, spiro(benzindoline)-naphthoxazines, spiro(indoline) naphthoxazines, spiro(indoline) pyrido-benzoxazines, spiro(indoline) benzoxazines, spiro (benzindoline) benzoxazines, spiro(benzindoline) pyridobenzoxazines, spiro(indoline) fluoranthenoxazines, spiro(indoline)-quinoxazines, spiropiperidine-naphthopyrans, piro (indoline) pyronobenzoxazinones, benzospiropyrans, naphthospiropyrans, spirobenzoxazine-pyrrolopyridines, spironaphthoxazine-pyrrolopyrridines, spiro-oxazepin-benzoxazines, spiro-oxazepin-naphthoxazines, spiro(indoline) benzothiazoloxazines, spiro(indoline) benzopyrroloxazines, spiro(indoline) quinazolino-oxazines, spiro(indoline)-anthracenobenzoxazines, benzofurobenzopyrans, benzothienobenzopyrans, naphthofuro-benzopyrans, benzopyrano-fusednaphthopyrans, spiro(isoindoline)-naphthoxazines, spiro(isoindoline) benzoxazines, etc. Such photochromic compounds are disclosed in U.S. Pat. Nos. 3,100,778, 3,562,172, 3,567,605, 3,578,602, 3,671,543, 4,215,010, 4,342,668, 4,440,672, 4,634,767, 4,636,561, 4,637,698, 4,699,473, 4,719,296, 4,720,547, 4,772,700, 4,784,474, 4,785,097, 4,816,584, 4,818,096, 4,826,977, 4,831,142, 4,880,667, 4,929,693, 4,931,219, 4,931,221, 4,959,471, 4,980,089, 4,986,934, 5,055,576, 5,066,818, 5,110,922, 5,114,621, 5,139,707, 5,166,345, 5,171,636, 5,180,524, 5,186,867, 5,200,116, 5,238,931, 5,238,981, 5,244,602, 5,274,132; 5,340,857, 5,369,158, 5,384,077, 5,395,567, 5,399,687, 5,405,958, 5,411,679, 5,429,774, 5,451,344, 5,458,814; 5,458,815, 5,464,567, 5,466,398, 5,514,817; 5,520,853, 5,552,090, 5,552,091, 5,565,147, 5,573,712; 5,578,252, 5,585,042, 5,623,005, 5,637,262, 5,637,709, 5,645,767; 5,650,098, 5,651,923, 5,656,206; 5,658,500, 5,658,501, 5,674,432, 5,698,141, 5,723,072, 5,728,758, 5,730,908, 5,744,070, 5,759,450, 5,783,116, 5,801,243, 5,808,063, 5,811,034, 5,831,090, 5,833,885, 5,869,658; 5,879,592, 5,891,368, 5,955,520; 5,961,892; 5,981,634, 5,998,520, 6,004,486, 6,017,121, 6,018,059; 6,019,914, 6,022,495, 6,022,497; 6,030,555, 6,034,193, 6,065,836, 6,106,744, 6,106,744, 6,107,395, 6,113,814, 6,146,554; 6,149,841, 6,153,126, 6,221,284, 6,248,264; 6,296,785, 6,315,928; 6,342,459; 6,348,604, 6,353,102, 6,414,057, 6,478,988, 6,630,597, 7,556,750, 7,584,630, 7,999,989, 8,158,037, 8,697,770, 8,698,117, 8,741,188, 9,029,532, 9,028,728, 9,052,438, 9,097,916, 9,465,234, 9,487,499, 9,904,074, 10,197,707, 10,501,446, 10,532,997, and 10,502,998 and are also described in the texts, Techniques in Chemistry, Volume III. "Photochromism", Chapter 3 (Glenn H. Brown, Editor, John Wiley and Sons, Inc., New York, 1971) and in "Chromic Phenomena: Technological Applications of Colour Chemistry" (P. Bamfield, RSC Books (2001)). Derivatives of these compounds that include various Substituents can be Synthesized from this teaching by people skilled in the art.

In a preferred embodiment, a polymerizable photochromic compound is used in the invention. Examples of preferred photochromic vinylic monomers include polymerizable naphthopyrans, polymerizable benzopyrans, polymerizable indenonaphthopyrans, polymerizable phenanthropyrans, polymerizable spiro(benzindoline)-naphthopyrans, polymerizable spiro(indoline) benzopyrans, polymerizable spiro(indoline)-naphthopyrans, polymerizable spiro(indoline) quinopyrans, polymerizable spiro(indoline)-pyrans, polymerizable naphthoxazines, polymerizable spirobenzopyrans; polymerizable spirobenzopyrans, polymerizable spirobenzothiopyrans, polymerizable naphthacenediones, polymerizable spirooxazines, polymerizable spiro (indoline) naphthoxazines, polymerizable spiro(indoline)-pyridobenzoxazines, polymerizable spiro(benzindoline) pyridobenzoxazines, polymerizable spiro(benzindoline) naphthoxazines, polymerizable spiro(indoline)-benzoxazines, polymerizable diarylethenes, and combinations thereof, as disclosed in U.S. Pat. Nos. 4,929,693, 5,166,345 6,017,121, 7,556,750, 7,584,630, 7,999,989, 8,158,037, 8,697,770, 8,741,188, 9,052,438, 9,097,916, 9,465,234, 9,904,074, 10,197,707, 6,019,914, 6,113,814, 6,149,841, 6,296,785, and 6,348,604.

In accordance with the invention, a lens-forming composition of the invention is a fluid composition, which can be a solution, a solventless blend (i.e., a fluid composition free of any non-reactive diluent-organic solvent).

Where a lens-forming composition of the invention is a solution. It can be prepared by dissolving all of the desirable components in any suitable solvent known to a person skilled in the art. Example of suitable solvents includes without limitation, water, tetrahydrofuran, tripropylene glycol methyl ether, dipropylene glycol methyl ether, ethylene glycol n-butyl ether, ketones (e.g., acetone, methyl ethyl ketone, etc.), diethylene glycol n-butyl ether, diethylene glycol methyl ether, ethylene glycol phenyl ether, propylene glycol methyl ether, propylene glycol methyl ether acetate, dipropylene glycol methyl ether acetate, propylene glycol n-propyl ether, dipropylene glycol n-propyl ether, tripropylene glycol n-butyl ether, propylene glycol n-butyl ether, dipropylene glycol n-butyl ether, tripropylene glycol n-butyl ether, propylene glycol phenyl ether dipropylene glycol dimetyl ether, polyethylene glycols, polypropylene glycols, ethyl acetate, butyl acetate, amyl acetate, methyl lactate, ethyl lactate, i-propyl lactate, methylene chloride, 2-butanol, 1-propanol, 2-propanol, menthol, cyclohexanol, cyclopentanol and exonorborneol, 2-pentanol, 3-pentanol, 2-hexanol, 3-hexanol, 3-methyl-2-butanol, 2-heptanol, 2-octanol, 2-nonanol, 2-decanol, 3-octanol, norborneol, tert-butanol, tert-amyl, alcohol, 2-methyl-2-pentanol, 2,3-dimethyl-2-butanol, 3-methyl-3-pentanol, 1-methylcyclohexanol, 2-methyl-2-hexanol, 3,7-dimethyl-3-octanol, 1-chloro-2-methyl-2-propanol, 2-methyl-2-heptanol, 2-methyl-2-octanol, 2-2-methyl-2-nonanol, 2-methyl-2-decanol, 3-methyl-3-hexanol, 3-methyl-3-heptanol, 4-methyl-4-heptanol, 3-methyl-3-octanol, 4-methyl-4-octanol, 3-methyl-3-nonanol, 4-methyl-4-nonanol, 3-methyl-3-octanol, 3-ethyl-3-hexanol, 3-methyl-3-heptanol, 4-ethyl-4-heptanol, 4-propyl-4-heptanol, 4-isopropyl-4-heptanol, 2,4-dimethyl-2-pentanol, 1-methylcyclopentanol, 1-ethylcyclopentanol, 1-ethylcyclopentanol, 3-hydroxy-3-methyl-1-butene, 4-hydroxy-4-methyl-1-cyclopentanol, 2-phenyl-2-propanol, 2-methoxy-2-methyl-2-propanol 2,3,4-trimethyl-3-pentanol, 3,7-dimethyl-3-octanol, 2-phenyl-2-butanol, 2-methyl-1-phenyl-2-propanol and 3-ethyl-3-pentanol, 1-ethoxy-2-propanol, 1-methyl-2-propanol, t-amyl alcohol, isopropanol, 1-methyl-2-pyrrolidone, N,N-dimethylpropionamide, dimethyl formamide, dimethyl acetamide, dimethyl propionamide, N-methyl pyrrolidinone, and mixtures thereof. Preferably, a polymerizable composition is a solution of all the desirable components in water, 1,2-propylene glycol, a polyethyleneglycol having a molecular weight of about 400 Daltons or less, or a mixture thereof.

Where a lens-forming composition of the invention is a solventless blend, it can be prepared by mixing all polymerizable components and other necessary component. A solventless lens-forming composition typically comprises at least one blending vinylic monomer as a reactive solvent for dissolving all other polymerizable components of the solventless lens-forming composition. Examples of preferred blending vinylic monomers are described later in this application. Preferably, methyl methacrylate is used as a blending vinylic monomer in preparing a solventless lens-forming composition.

In a preferred embodiment, a lens-forming composition of the invention comprises: (i)(a) from about 5% to about 60% by weight, preferably from about 10% to about 50% by weight, even more preferably from about 15% to about 45% by weight, even more preferably from about 20% to about 40% by weight, of at least one hydrophilic (meth)acrylamide-type monomer; (ii)(a) from about 5% to about 50% by weight, preferably from about 10% to about 40% by weight, more preferably from about 15% to about 30% by weight, of at least one siloxane-containing (meth)acrylamido monomer; (ii)(b) from about 5% to about 50%, preferably from about 10% to about 40% by weight, more preferably from about 15% to about 35% by weight, of at least one polysiloxane vinylic crosslinker (preferably at least one α,ω-dimethacrylamido-terminated polysiloxane crosslinker); (iii) from about 0.1% to about 2.5% by weight, preferably from about 0.2% to about 2.0% by weight, more preferably from about 0.3% to about 1.5% by weight, of said at least one polymerizable UV-absorbing compound and said at least one polymerizable HEVL-absorbing compound; and (iv) from about 0.05% to about 1.5% by weight, preferably from about 0.1% to 1.3% by weight, more preferably from about 0.5% to about 1.1% by weight, of at least one acytin photoinitiator. The foregoing range combinations are presented with the proviso that the listed components and any additional components add up to 100% by weight.

In accordance with the invention, the lens-forming composition of the invention can be introduced (dispensed) into a cavity formed by a mold according to any known methods.

After the lens-forming composition is dispensed into the mold, it is polymerized to produce a UV- and HEVL-absorbing SiHy contact lens. Crosslinking is initiated upon exposure to a visible light in a region between 455 nm to 510 nm, preferably under a spatial limitation of actinic radiation, to crosslink the polymerizable components in the lens-forming composition.

In accordance with the invention, light source can be any ones emitting light in the 455 nm to 510 nm range sufficient to activate acyltin photoinitiators.

The crosslinking according to the invention may be effected in a very short time, e.g. in ≤ about 80 seconds, preferably in ≤about 70 seconds, more preferably in ≤60 about seconds, even more preferably in ≤about 50 seconds, and most preferably in 10 to 40 seconds.

Opening of the mold so that the molded SiHy contact lens can be removed from the mold may take place in a manner known per se.

The molded UV- and HEVL-absorbing SiHy contact lenses can be subject to lens extraction with a liquid extraction medium to remove unpolymerized polymerizable components and formed and oligomers. In accordance with the invention, the extraction liquid medium is any solvent capable of dissolving the organic solvent, unpolymerized polymerizable materials, and oligomers in the dry contact lens. Water, any organic solvents known to a person skilled in the art, or a mixture thereof can be used in the invention. Preferably, the organic solvents used extraction liquid medium are water, a buffered saline, a $C_1$-$C_3$ alkyl alcohol, 1,2-propylene glycol, a polyethyleneglycol having a number average molecular weight of about 400 Daltons or less, a $C_1$-$C_6$ alkylalcohol, or combinations thereof.

The molded UV- and HEVL-absorbing SiHy contact lenses can also subject to further processes, such as, for example, surface treatment (for example, such as, plasma treatment, chemical treatments, the grafting of hydrophilic monomers or macromers onto the surface of a lens, Layer-by-layer coating, in-package crosslinking of a thermally-reactive hydrophilic polymeric material, etc.); packaging in lens packages with a packaging solution which can contain about 0.005% to about 5% by weight of a wetting agent (e.g., a hydrophilic polymer), a viscosity-enhancing agent (e.g., methyl cellulose (MC), ethyl cellulose, hydroxymethylcellulose, hydroxyethyl cellulose (HEC), hydroxypropylcellulose (HPC), hydroxypropylmethyl cellulose (HPMC), or a mixture thereof), or an in-package-coating material; sterilization such as autoclave at from 118 to 124° C. for at least about 30 minutes; and the like.

Preferred surfaces treatments are layer-by-layer (LbL) coating such as those described in U.S. Pat. Nos. 6,451,871, 6,719,929, 6,793,973, 6,811,805, 6,896,926, plasma treatment, in-package-coating such as those disclosed in U.S. Pat. Nos. 8,557,334, 8,529,057 and 9,505,184. A preferred plasma treatment is those processes in which an ionized gas is applied to the surface of an article as described in U.S. Pat. Nos. 4,312,575 and 4,632,844 (incorporated herein by reference in their entireties).

The molded UV- and HEVL-absorbing SiHy contact lens is hydrated in water or an aqueous solution to replace the liquid extraction medium, according to any method known to a person skilled in the art.

The hydrated and/or surface-treated UV- and HEVL-absorbing SiHy contact lens can further subject to further processes, such as, for example, packaging in lens packages with a packaging solution which is well known to a person skilled in the art; sterilization such as autoclave at from 118 to 124° C. for at least about 30 minutes; and the like.

Lens packages (or containers) are well known to a person skilled in the art for autoclaving and storing a soft contact lens. Any lens packages can be used in the invention. Preferably, a lens package is a blister package which comprises a base and a cover, wherein the cover is detachably sealed to the base, wherein the base includes a cavity for receiving a sterile packaging solution and the contact lens.

Lenses are packaged in individual packages, sealed, and sterilized (e.g., by autoclave at about 120° C. or higher for at least 30 minutes under pressure) prior to dispensing to users. A person skilled in the art will understand well how to seal and sterilize lens packages.

A contact lens of the invention has an oxygen permeability of preferably at least about 40 barrers, more preferably at least about 60 barrers, even more preferably at least about 80 barrers (at about 35° C.).

A contact lens of the invention has an elastic modulus of about 1.5 MPa or less, preferably about 1.2 MPa or less, more preferably from about 0.3 MPa to about 1.0 MPa (at a temperature of from about 22° C. to 28° C.).

A contact lens of the invention further has an equilibrium water content of from about 15% to about 75%, more preferably from about 20% to about 70% by weight, even more preferably from about 25% to about 65% by weight (at room temperature) when fully hydrated. The equilibrium water content of a photochromic SiHy contact lens can be measured according to the procedure disclosed in Example 1.

In another aspect, the invention provides a UV- and HEVL-absorbing SiHy contact lens obtained by the method of the invention.

It should be understood that although in this aspect of the invention various embodiments including preferred embodiments of the invention may be separately described above, they can be combined and/or used together in any desirable fashion to arrive at different embodiments of a contact lenses of the invention.

Although various embodiments of the invention have been described using specific terms, devices, and methods, such description is for illustrative purposes only. The words used are words of description rather than of limitation. It is to be understood that changes and variations may be made by those skilled in the art without departing from the spirit or scope of the present invention, which is set forth in the following claims. In addition, it should be understood that aspects of the various embodiments may be interchanged either in whole or in part or can be combined in any manner and/or used together, as illustrated below:

1. A method for producing UV-absorbing silicone hydrogel contact lenses, the method comprising the steps of:
   (1) providing a mold for making a soft contact lens, wherein the mold has a first mold half with a first molding surface defining the anterior surface of a contact lens and a second mold half with a second molding surface defining the posterior surface of the contact lens, wherein said first and second mold halves are configured to receive each other such that a cavity is formed between said first and second molding surfaces;
   (2) introducing a lens-forming composition into the cavity, wherein the lens-forming composition comprises
      (i) at least one hydrophilic vinylic monomer,
      (ii) at least one siloxane-containing vinylic monomer and/or at least one polysiloxane vinylic crosslinker,
      (iii) at least one polymerizable UV-absorbing compound and at least one polymerizable HEVL-absorbing compound in amounts sufficient to provide the lens-forming composition with an average UVB transmittance of about 10% or less between 280 and 315 nanometers, an average UVA transmittance of about 30% or less between 315 and 380 nanometers, and an average Violet transmittance of about 70% or less between 380 nm and 440 nm, and
      (iv) from about 0.05% to about 1.5% by weight of at least one acyltin photoinitiator capable of initiating a free-radical polymerization under irradiation with a light source including a light in the region of from 455 nm to 510 nm; and
   (3) irradiating the lens-forming composition in the mold by using the light source including a light in a region of from 455 nm to 510 nm, so as to form the UV- and HEVL-absorbing silicone hydrogel contact lens, wherein the formed UV-absorbing silicone hydrogel contact lens has a UVB transmittance of about 10% or less between 280 and 315 nanometers and a UVA transmittance of about 30% or less between 315 and 380 nanometers and and the Violet transmittance of about 70% or less between 380 nm and 440 nm.
2. The method of embodiment 1, wherein said at least one polymerizable UV-absorbing compound and said at least one polymerizable HEVL-absorbing compound are present in amounts sufficient to provide the lens-forming composition with an average UVB transmittance of about 5% or less between 280 and 315 nanometers, an average UVA transmittance of about 20% or less between 315 and 380 nanometers, and an average Violet transmittance of about 60% or less between 380 nm and 440 nm.
3. The method of embodiment 1, wherein said at least one polymerizable UV-absorbing compound and said at least one polymerizable HEVL-absorbing compound are present in amounts sufficient to provide the lens-forming composition with an average UVB transmittance of about 2.5% or less between 280 and 315 nanometers, an average UVA transmittance of about 10% or less between 315 and 380 nanometers, and an average Violet transmittance of about 50% or less between 380 nm and 440 nm.
4. The method of embodiment 1, wherein said at least one polymerizable UV-absorbing compound and said at least one polymerizable HEVL-absorbing compound are present in amounts sufficient to provide the lens-forming composition with an average UVB transmittance of about 1% or less between 280 and 315 nanometers, an average UVA transmittance of about 5% or less between 315 and 380 nanometers, and an average Violet transmittance of about 40% or less between 380 nm and 440 nm.
5. The method of any one of embodiments 1 to 4, wherein the formed UV-absorbing silicone hydrogel contact lens has a UVB transmittance of about 5% or less between 280 and 315 nanometers and a UVA transmittance of about 20% or less between 315 and 380 nanometers and and (c) the Violet transmittance of about 60% or less between 380 nm and 440 nm.
6. The method of any one of embodiments 1 to 4, wherein the formed UV-absorbing silicone hydrogel contact lens has a UVB transmittance of about 2.5% or less between 280 and 315 nanometers and a UVA transmittance of about 10% or less between 315 and 380 nanometers and and (c) the Violet transmittance of about 50% or less between 380 nm and 440 nm.
7. The method of any one of embodiments 1 to 4, wherein the formed UV-absorbing silicone hydrogel contact lens has a UVB transmittance of about 1% or less between 280 and 315 nanometers and a UVA transmittance of about 5% or less between 315 and 380 nanometers and and (c) the Violet transmittance of about 40% or less between 380 nm and 440 nm.
8. The method of any one of embodiments 1 to 7, wherein said at least one hydrophilic vinylic monomer comprises: (1) an alkyl (meth)acrylamide selected from the group consisting of (meth)acrylamide, N,N-dimethyl (meth)acrylamide, N-ethyl (meth)acrylamide, N,N-diethyl (meth)acrylamide, N-propyl (meth)acrylamide, N-isopropyl (meth)acrylamide, N-3-methoxypropyl (meth)acrylamide, and combinations thereof; (2) a hydroxyl-containing acrylic monomer selected from the group consisting of N-2-hydroxylethyl (meth)acrylamide, N,N-bis(hydroxyethyl) (meth)acrylamide, N-3-hydroxypropyl (meth)acrylamide, N-2-hydroxypropyl (meth)acrylamide, N-2,3-dihydroxypropyl (meth)acrylamide, N-tris(hydroxymethyl) methyl (meth)acrylamide, 2-hydroxyethyl(meth)acrylate, 3-hydroxypropyl(meth)acrylate, 2-hydroxypropyl (meth)acrylate, glycerol methacrylate (GMA), di(ethylene glycol) (meth)acrylate, tri(ethylene glycol) (meth)acrylate, tetra(ethylene glycol) (meth)acrylate, poly(ethylene glycol) (meth)acrylate having a number average molecular weight of up to 1500, poly(ethylene glycol)ethyl (meth)acrylamide having a number average molecular weight of up to 1500, and combinations thereof; (3) a carboxyl-containing acrylic monomer selected from the group consisting of 2-(meth)acrylamidoglycolic acid, (meth)acrylic acid, ethylacrylic acid, 3-(meth)acrylamidopropionic acid, 5-(meth)acrylamidopentanoic acid, 4-(meth)acrylamidobutanoic acid, 3-(meth)acrylamido-2-methylbutanoic acid, 3-(meth)acrylamido-3-methylbutanoic acid, 2-(meth) acrylamido-2methyl-3,3-dimethyl butanoic acid, 3-(meth)acrylamidohaxanoic acid, 4-(meth)acrylamido-3,3-dimethylhexanoic acid, and combinations thereof; (4) an amino-containing acrylic monomer selected from the group consisting of N-2-aminoethyl (meth)acrylamide, N-2-methylaminoethyl (meth)acrylamide, N-2-ethylaminoethyl (meth)acrylamide, N-2-dimethylamino-ethyl (meth)acrylamide, N-3-aminopropyl (meth)acrylamide, N-3-methylaminopropyl (meth)acrylamide, N-3-dimethylaminopropyl (meth) acrylamide, 2-aminoethyl(meth)acrylate, 2-methylaminoethyl(meth)acrylate, 2-ethylaminoethyl(meth)acrylate, 3-aminopropyl(meth)acrylate, 3-methylaminopropyl(meth)acrylate, 3-ethylaminopropyl(meth)acrylate, 3-amino-2-hydroxypropyl(meth) acrylate, trimethylammonium 2-hydroxy propyl (meth) acrylate hydrochloride, dimethylaminoethyl(meth) acrylate, and combinations thereof; (5) an N-vinyl amide monomer selected from the group consisting of N-vinylpyrrolidone (aka, N-vinyl-2-pyrrolidone), N-vinyl-3-methyl-2-pyrrolidone, N-vinyl-4-methyl-2-pyrrolidone, N-vinyl-5-methyl-2-pyrrolidone, N-vinyl-6-methyl-2-pyrrolidone, N-vinyl-3-ethyl-2-pyrrolidone, N-vinyl-4,5-dimethyl-2-pyrrolidone, N-vinyl-5, 5-dimethyl-2-pyrrolidone, N-vinyl-3,3,5-trimethyl-2-pyrrolidone, N-vinyl piperidone (aka, N-vinyl-2-piperidone), N-vinyl-3-methyl-2-piperidone, N-vinyl-4-methyl-2-piperidone, N-vinyl-5-methyl-2-piperidone, N-vinyl-6-methyl-2-piperidone, N-vinyl-6-ethyl-2-piperidone, N-vinyl-3,5-dimethyl-2-piperidone, N-vinyl-4,4-dimethyl-2-piperidone, N-vinyl caprolactam (aka, N-vinyl-2-caprolactam), N-vinyl-3-methyl-2-caprolactam, N-vinyl-4-methyl-2-caprolactam, N-vinyl-7-methyl-2-caprolactam, N-vinyl-7-ethyl-2-caprolactam, N-vinyl-3,5-dimethyl-2-caprolactam, N-vinyl-4,6-dimethyl-2-caprolactam, N-vinyl-3,5,7-trimethyl-2-caprolactam, N-vinyl-N-methyl acetamide, N-vinyl formamide, N-vinyl acetamide, N-vinyl isopropylamide, N-vinyl-N-ethyl acetamide, N-vinyl-N-ethyl formamide, and mixtures thereof; (6) a methylene-containing pyrrolidone monomer selected from the group consisting of 1-methyl-3-methylene-2-pyrrolidone, 1-ethyl-3-methylene-2-pyrrolidone, 1-methyl-5-methylene-2-pyrrolidone, 1-ethyl-5-methylene-2-pyrrolidone, 5-methyl-3-methylene-2-pyrrolidone, 5-ethyl-3-methylene-2-pyrrolidone, 1-n-propyl-3-methylene-2-pyrrolidone, 1-n-propyl-5-methylene-2-pyrrolidone, 1-isopropyl-3-methylene-2-pyrrolidone, 1-isopropyl-5-methylene-2-pyrrolidone, 1-n-butyl-3-methylene-2-pyrrolidone, 1-tert-butyl-3-methylene-2-pyrrolidone, and combinations thereof; (7) an acrylic monomer having a $C_1$-$C_4$ alkoxyethoxy group and selected from the group consisting of ethylene glycol methyl ether (meth)acrylate, di(ethylene glycol)methyl ether (meth)acrylate, tri(ethylene glycol)methyl ether (meth)acrylate, tetra(ethylene glycol)methyl ether (meth)acrylate, $C_1$-$C_4$-alkoxy poly(ethylene glycol) (meth)acrylate having a number average molecular weight of up to 1500, methoxy-poly (ethylene glycol)ethyl (meth)acrylamide having a number average molecular weight of up to 1500, and combinations thereof; (8) a vinyl ether monomer selected from the group consisting of ethylene glycol monovinyl ether, di(ethylene glycol) monovinyl ether, tri(ethylene glycol) monovinyl ether, tetra(ethylene glycol) monovinyl ether, poly(ethylene glycol) monovinyl ether, ethylene glycol methyl vinyl ether, di(ethylene glycol)methyl vinyl ether, tri(ethylene glycol) methyl vinyl ether, tetra(ethylene glycol)methyl vinyl ether, poly(ethylene glycol)methyl vinyl ether, and combinations thereof; (9) an allyl ether monomer selected from the group consisting of ethylene glycol monoallyl ether, di(ethylene glycol) monoallyl ether, tri(ethylene glycol) monoallyl ether, tetra(ethylene glycol) monoallyl ether, poly(ethylene glycol) monoallyl ether, ethylene glycol methyl allyl ether, di(ethylene glycol)methyl allyl ether, tri(ethylene glycol)methyl allyl ether, tetra(ethylene glycol)methyl allyl ether, poly(ethylene glycol)methyl allyl ether, and combinations thereof; (10) a phosphorylcholine-containing vinylic monomer selected from the group consisting of (meth)acryloyloxyethyl phosphorylcholine, (meth) acryloyloxypropyl phosphorylcholine, 4-((meth)acryloyloxy)butyl-2'-(trimethylammonio)ethylphosphate, 2-[(meth)acryloylamino]ethyl-2'-(trimethylammonio)-ethylphosphate, 3-[(meth)acryloylamino]propyl-2'-(trimethylammonio)ethyl-phosphate, 4-[(meth)acryloylamino]butyl-2'-(trimethylammonio) ethylphosphate, 5-((meth)acryloxy) pentyl-2' (trimethylammonio)ethyl phosphate, 6-((meth)acryloyloxy) hexyl-2'-(trimethylammonio)ethylphosphate, 2-((meth)acryloyloxy)ethyl-2'-(triethylammonio)ethylphosphate. 2-((meth)acryloyloxy)ethyl-2'-(tripropylammonio)ethylphosphate, 2-((meth)acryloxy)-ethyl-2'-(tributylammonio)ethyl phosphate. 2-((meth) acryloyloxy) propyl-2'-(trimethylammonio)-ethylphosphate, 2-((meth)acryloyloxy)butyl-2'-(trimethylammonio)ethylphosphate, 2. ((meth) acryloxy) pentyl-2'-(trimethylammonio) ethylphosphate, 2-((meth)acryloyloxy) hexyl-2'-(trimethylammonio)ethyl phosphate, 2-(vinyloxy) ethyl-2'-(trimethylammonio)ethylphosphate, 2-(allyloxy)ethyl-2'-(trimethylammonio)ethylphosphate, 2-(vinyloxycarbonyl)ethyl-2'-(trimethylammonio)ethyl phosphate, 2-(allyloxycarbonyl)ethyl-2'-(trimethylammonio)-ethylphosphate, 2-(vinylcarbonylamino)ethyl-2' (trimethylammonio) ethylphosphate, 2-(allyloxycarbonylamino)ethyl-2'-(trimethylammonio)ethyl phosphate. 2-(butenoyloxy) ethyl-2'-(trimethylammonio)ethylphosphate, and combinations thereof; (11) allyl alcohol; (12) N-2-hydroxyethyl vinyl carbamate; (13) N-carboxyvinyl-β-alanine (VINAL); (14) N-carboxyvinyl-α-alanine; (15) or combinations thereof.

9. The method of any one of embodiments 1 to 8, wherein the lens-forming composition comprises said at least one siloxane-containing vinylic monomer which comprises a siloxane-containing (meth)acrylamido monomer, a siloxane-containing (meth)acryloxy monomer, a siloxane-containing vinyloxycarbonyloxy monomer, a siloxane-containing vinyloxycarbonylamino monomer, a siloxane-containing vinylaminocarbonylamino monomer, a siloxane-containing vinylaminocarbonyloxy monomer, or combination thereof, where each of said at least one siloxane-containing vinylic monmer comprises a bis(trialkylsilyloxy)alkylsilyl group, a tris (trialkylsilyloxy)-silyl group, or a polysiloxane chain having 2 to 30 siloxane units and terminated with an alkyl, hydroxyalkyl or methoxyalkyl group.

10. The method of any one of embodiments 1 to 7, wherein the lens-forming composition comprises (i)(a) at least one hydrophilic (meth)acrylamido monomer, (ii)(a) at least one siloxane-containing (meth)acrylamido monomer, (ii)(b) at least one polysiloxane vinylic crosslinker, (iii) said at least one polymerizable UV-absorbing compound and said at least one polymerizable HEVL-absorbing compound, and (iv) from about 0.05% to about 1.5% by weight of at least one an acyltin photoinitiator capable of initiating a free-radical polymerization under irradiation with a light source including a light in the region of about 455 to about 510 nm, wherein the sum of the amounts of components (i)(a), (ii)(a), (ii)(b), (iii) and (iv) is at least 90% by weight relative to total amount of all polymerizable components in the lens-forming composition, wherein the lens-forming composition has a curing time of about 60 seconds or less as determined in photo-rheology study using a LED light source which provide a visible light with a spectral centroid of about 472 nm and a total irradiance of about 55 $mW/cm^2$.

11. The method of embodiment 10, wherein the sum of the amounts of components (i)(a), (ii)(a), (ii)(b), (iii) and (iv) is at least 93% by weight relative to total amount of all polymerizable components in the polymerizable composition.

12. The method of embodiment 10, wherein the sum of the amounts of components (i)(a), (ii)(a), (ii)(b), (iii) and (iv) is at least 96% by weigh relative to total amount of all polymerizable components in the lens-forming composition.

13. The method of embodiment 10, wherein the sum of the amounts of components (i)(a), (ii)(a), (ii)(b), (iii) and (iv) is at least 98% by weight relative to total amount of all polymerizable components in the lens-forming composition.

14. The method of any one of embodiments 10 to 13, wherein the lens-forming composition in the mold is irradiated for about 90 second or less.

15. The method of any one of embodiments 10 to 13, wherein the lens-forming composition in the mold is irradiated for about 80 second or less.

16. The method of any one of embodiments 10 to 13, wherein the lens-forming composition in the mold is irradiated for about 70 second or less.

17. The method of any one of embodiments 10 to 16, wherein the mold is a reusable mold suitable, wherein the step of irradiating is performed under a spatial limitation of actinic radiation, wherein the formed UV- and HEVL-absorbing silicone hydrogel contact lens comprises a lens edge defined by the spatial limitation of actinic radiation.

18. The method of any one of embodiments 10 to 17, wherein said at least one hydrophilic (meth)acrylamido monomer comprises (meth)acrylamide, N,N-dimethyl (meth)acrylamide, N-ethyl (meth)acrylamide, N,N-diethyl (meth)acrylamide, N-propyl (meth)acrylamide, N-isopropyl (meth)acrylamide, N-3-methoxypropyl (meth)acrylamide, N-2-hydroxylethyl (meth)acrylamide, N,N-bis(hydroxyethyl) (meth)acrylamide, N-3-hydroxypropyl (meth)acrylamide, N-2-hydroxypropyl (meth)acrylamide, N-2,3-dihydroxypropyl (meth)acrylamide, N-4-hydroxybutyl (meth)acrylamide, N,N-bis (2-hydroxyethyl) (meth)acrylamide, N-tris(hydroxymethyl) methyl (meth)acrylamide, 2-(meth) acrylamidoglycolic acid, 3-(meth)acrylamido-propionic acid, 4-(meth)acrylamido-butanoic acid, 3-(meth)acrylamido-2-methylbutanoic acid, 3-(meth) acrylamido-3-methylbutanoic acid, 2-(meth)acrylamido-2-methyl-3,3-dimethyl butanoic acid, 5-(meth) acrylamidopentanoic acid, 3-(meth) acrylamidohaxanoic acid, 4-(meth)acrylamido-3,3-dimethylhexanoic acid, (3-(meth)acrylamidophenyl) boronic acid, 3-((3-methacrylamidopropyl)dimethylammonio)-propane-1-sulfonate; 3-((3-acrylamidopropyl)dimethylammonio) propane-1-sulfonate, N-2-aminoethyl (meth)acrylamide, N-2-methylaminoethyl (meth)acrylamide, N-2-ethylaminoethyl (meth)acrylamide, N-2-dimethylaminoethyl (meth)acrylamide, N-3-aminopropyl (meth)acrylamide, N-3-methylaminopropyl (meth)acrylamide, N-3-dimethylaminopropyl (meth)acrylamide, poly(ethylene glycol)ethyl (meth) acrylamide having a number average molecular weight of up to 700, methoxy-poly(ethylene glycol)ethyl (meth)acrylamide having a number average molecular weight of up to 700, or combination thereof.

19. The method of any one of embodiments 10 to 17, wherein said at least one hydrophilic (meth)acrylamido monomer comprises N,N-dimethyl (meth)acrylamide, N-ethyl (meth)acrylamide, N-2-hydroxyethyl (meth) acrylamide, N-3-hydroxypropyl (meth)acrylamide, N-2-hydroxypropyl (meth)acrylamide, N-2,3-dihydroxypropyl (meth)acrylamide, (meth)acrylamide, N-(2-aminoethyl) (meth)acrylamide, N-(3-aminopropyl) (meth)acrylamide, or combinations thereof, more preferably is N,N-dimethylacrylamide.

20. The method of any one of embodiments 10 to 19, wherein said at least one hydrophilic (meth)acrylamido monomer comprises N,N-dimethyl (meth)acrylamide.

21. The method of any one of embodiments 10 to 20, wherein said at least one siloxane-containing (meth) acrylamido monomer comprises a (meth)acrylamido monomer containing a tris(trialkylsiloxy) silyl group.

22. The method of embodiment 21, wherein the (meth) acrylamido monomer containing a tris(trialkylsiloxy) silyl group is N-[tris(trimethylsiloxy) silylpropyl] (meth)acrylamide, N-[tris(dimethylethylsiloxy)-silylpropyl] (meth)acrylamide, N-[tris(dimethylpropylsiloxy) silylpropyl] acrylamide, N-[tris(dimethylphenylsiloxy)silylpropyl] (meth)acrylamide, N-(2-hydroxy-3-(3-(tris(trimethylsilyloxy)silyl)propyloxy)propyl)-2-methyl acrylamide, N-(2-hydroxy-3-(3-(tris (trimethylsilyloxy)silyl)propyloxy)propyl) acrylamide, N,N-bis[2-hydroxy-3-(3-(tris(trimethylsilyloxy)silyl) propyloxy)propyl]-2-methyl acrylamide, N,N-bis[2-hydroxy-3-(3-(tris(trimethylsilyloxy)silyl)propyloxy) propyl]acrylamide, or a combination thereof.

23. The method of any one of embodiments 10 to 22, wherein said at least one siloxane-containing (meth) acrylamido monomer comprises a (meth)acrylamido monomer containing a bis(trialkylsilyloxy)alkylsilyl group.

24. The method of embodiment 23, wherein the (meth) acrylamido monomer containing a bis(trialkylsilyloxy) alkylsilyl group is N-(2-hydroxy-3-(3-(bis(trimethylsilyloxy)methylsilyl)-propyloxy)propyl)-2-methyl acrylamide, N-(2-hydroxy-3-(3-(bis(trimethylsilyloxy)-methylsilyl) propyloxy)propyl) acrylamide, N,N-bis[2-hydroxy-3-(3-(bis(trimethylsilyloxy)-methylsilyl) propyloxy)propyl]-2-methyl acrylamide, N,N-bis [2-hydroxy-3-(3-(bis(trimethylsilyloxy)methylsilyl) propyloxy)propyl]acrylamide, N-[2-hydroxy-3-(3-(t- butyldimethylsilyl) propyloxy)propyl]-2-methyl acrylamide, a siloxane-containing (meth)acrylamido monomer of one of formula (Ia) to (Ih)

(Ia)

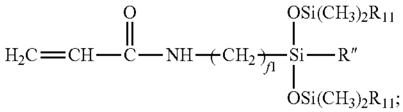

(Ib)

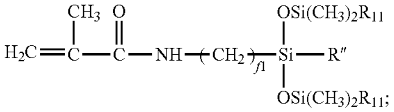

(Ic)

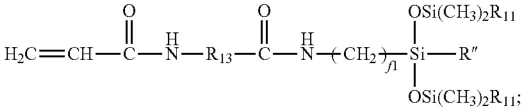

(Id)

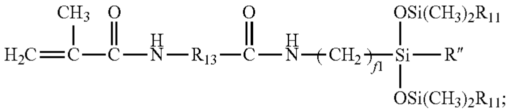

(Ie)

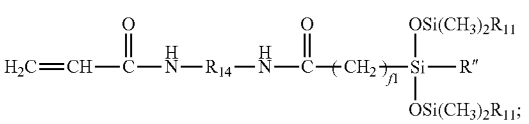

(If)

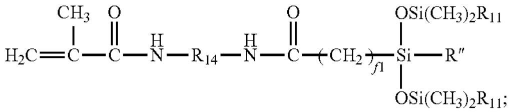

(Ig)

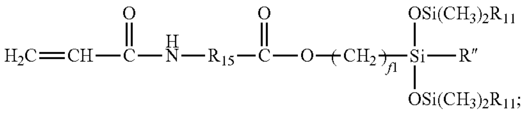

(Ih)

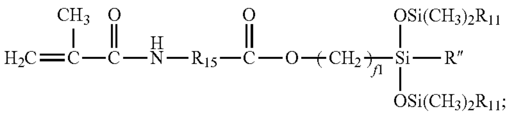

in which $R_{13}$ is a divalent alkylene radical of is a divalent alkylene radical of —$CH_2CH_2$— or —$CH_2CH_2CH_2$—, and $R_{15}$ is a divalent alkylene radical of

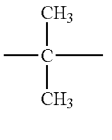 or 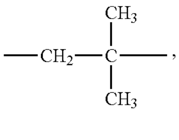, R″ and $R_{11}$ independent of each other is $C_1$-$C_4$ alkyl, and f1 is an integer of from 3 to 5.

25. The method of any one of embodiments 10 to 24, wherein said at least one siloxane-containing (meth) acrylamido monomer comprises a mono-(meth)acrylamido-terminated oligo- or polysiloxane of formula (IIa)

(IIa)

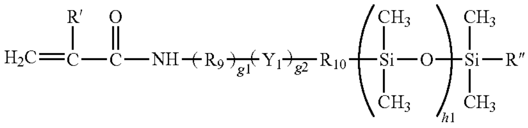

in which R' is hydrogen or methyl, R" independent of each other is $C_1$-$C_6$ alkyl, g1 and g2 independent of each other are integer of 0 or 1, h1 is an integer of 2 to 25, $R_9$ and $R_{10}$ independent of each other are a substituted or unsubstituted $C_1$-$C_{10}$ alkylene divalent radical, $Y_1$ is a linkage of

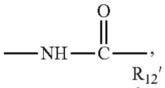, 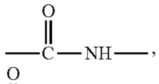, or

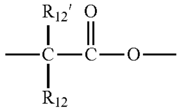

in which $R_{12}$ and $R_{12}$' independent of each other are $C_1$-$C_6$ alkyl.

26. The method of embodiment 25, wherein in formula (11a) h1 is an integer of 3 to 20 (more preferably 3 to 15)

27. The method of embodiment 25 or 26, wherein in formula (11a) $R_{12}$ and $R_{12}$' independent of each other are methyl.

28. The method of any one of embodiments 10 to 27, wherein the lens-forming composition comprises: (i)(a) from about 5% to about 60% by weight of at least one hydrophilic (meth)acrylamide-type monomer; (ii)(a) from about 5% to about 50% by weight of at least one siloxane-containing (meth)acrylamido monomer; (ii)(b) from about 5% to about 50% by weight of at least one polysiloxane vinylic crosslinker; (iii) from about 0.1% to about 2.5% by weight of said at least one polymerizable UV-absorbing compound and said at least one polymerizable HEVL-absorbing compound; and (iv) from about 0.05% to about 1.5% by weight, preferably from about 0.1% to 1.3% by weight, more preferably from about 0.5% to about 1.1% by weight, of at least one acytin photoinitiator.

29. The method of embodiment 28, wherein the lens-forming composition comprises from about 10% to about 50% by weight of at least one hydrophilic (meth)acrylamide-type monomer.

30. The method of embodiment 28, wherein the lens-forming composition comprises from about 15% to about 45% by weight of at least one hydrophilic (meth)acrylamide-type monomer.

31. The method of embodiment 28, wherein the lens-forming composition comprises from about 20% to about 40% by weight of at least one hydrophilic (meth)acrylamide-type monomer.

32. The method of any one of embodiments 28 to 31, wherein the lens-forming composition comprises from about 10% to about 40% by weight of at least one siloxane-containing (meth)acrylamido monomer.

33. The method of any one of embodiments 28 to 31, wherein the lens-forming composition comprises from about 15% to about 30% by weight of at least one siloxane-containing (meth)acrylamido monomer.

34. The method of any one of embodiments 28 to 33, wherein the lens-forming composition comprises from about 10% to about 40% by weight of at least one polysiloxane vinylic crosslinker.

35. The method of any one of embodiments 28 to 33, wherein the lens-forming composition comprises from about 15% to about 35% by weight of at least one polysiloxane vinylic crosslinker.

36. The method of embodiment 34 or 35, wherein said at least one polysiloxane vinylic crosslinker is an α,ω-dimethacrylamido-terminated polysiloxane crosslinker.

37. The method of any one of embodiments 10 to 36, wherein the lens-forming composition comprises from about 0.2% to about 2.0% by weight of said at least one polymerizable UV-absorbing compound and said at least one polymerizable HEVL-absorbing compound.

38. The method of any one of embodiments 10 to 36, wherein the lens-forming composition comprises from about 0.3% to about 1.5% by weight of said at least one polymerizable UV-absorbing compound and said at least one polymerizable HEVL-absorbing compound.

39. The method of any one of embodiments 10 to 38, wherein the lens-forming composition comprises from about 0.1% to 1.3% by weight of at least one acytin photoinitiator.

40. The method of any one of embodiments 10 to 38, wherein the lens-forming composition comprises from about 0.5% to about 1.1% by weight of at least one acytin photoinitiator.

41. The method of any one of embodiments 1 to 40, wherein the lens-forming composition comprises said at least one polysiloxane vinylic crosslinker which comprises: an α,ω-(meth)acryloxy-terminated polydimethylsiloxane; an α,ω-(meth)acrylamido-terminated polydimethylsiloxane; an α,ω-vinyl carbonate-terminated polydimethylsiloxane; an α,ω-vinyl carbamate-terminated polydimethylsiloxane; a bis-3-methacryloxy-2-hydroxypropyloxypropyl polydimethylsiloxane; N,N,N',N'-tetrakis(3-methacryloxy-2-hydroxypropyl)-alpha,omega-bis-3-aminopropyl-polydimethylsiloxane of various molecular weight; a reaction product of glycidyl methacrylate with a di-amino-functionalized polydimethylsiloxane; a reaction product of an azlactone-containing vinylic monomer with a d-hydroxyl-functionalized polydimethylsiloxane; or combinations thereof.

42. The method of any one of embodiments 1 to 40, wherein the lens-forming composition comprises said at least one polysiloxane vinylic crosslinker which comprises a vinylic crosslinker of formula (H)

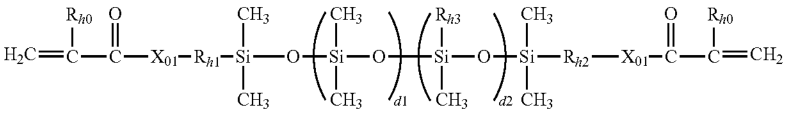

(H)

in which:

d1 is an integer of from 30 to 500 and d2 is an integer of from 1 to 75, provided that d2/d1 is from about 0.035 to about 0.15 (preferably from about 0.040 to about 0.12, even more preferably from about 0.045 to about 0.10);

$X_{01}$ is O or $NR_{hN}$ in which $R_{hN}$ is hydrogen or $C_1$-$C_{10}$-alkyl;

$R_{h0}$ is hydrogen or methyl;

$R_{h1}$ and $R_{h2}$ independently of each other are a substituted or unsubstituted $C_1$-$C_{10}$ alkylene divalent radical or a divalent radical of —$R_{h4}$—O—$R_{h5}$-in which $R_{h4}$ and $R_{h5}$ independently of each other are a substituted or unsubstituted $C_1$-$C_{10}$ alkylene divalent radical;

$R_{h3}$ is a monovalent radical of any one of formula (H-a) to (H-e)

(H-a)

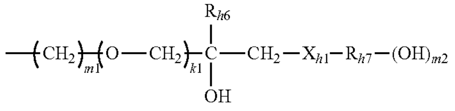

(H-b)

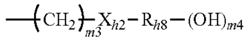

(H-c)

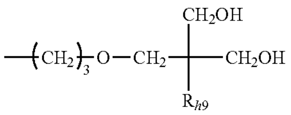

(H-d)

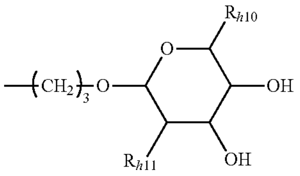

(H-e)

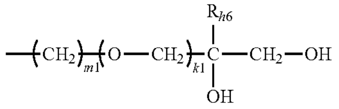

k1 is zero or 1; m1 is an integer of 2 to 4; m2 is an integer of 1 to 5; m3 is an integer of 3 to 6;

m4 is an integer of 2 to 5;

$R_{h6}$ is hydrogen or methyl;

$R_{h7}$ is a $C_2$-$C_6$ hydrocarbon radical having (m2+1) valencies;

$R_{h8}$ is a $C_2$-$C_6$ hydrocarbon radical having (m4+1) valencies;

$R_{h9}$ is ethyl or hydroxymethyl;

$R_{h10}$ is methyl or hydromethyl;

$R_{h11}$ is hydroxyl or methoxy;

$X_{h1}$ is a sulfur linkage of —S— or a teriary amino linkage of —$NR_{h12}$-in which $R_{h12}$ is $C_1$-$C_1$ alkyl, hydroxyethyl, hydroxypropyl, or 2,3-dihydroxypropyl; and $X_{h2}$ is a linkage of

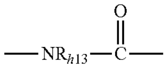

or

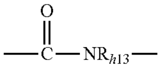

in which $R_{h13}$ is hydrogen or $C_1$-$C_{10}$ alkyl.

43. The method of any one of embodiments 1 to 42, wherein the lens-forming composition comprises said at least one polysiloxane vinylic crosslinker which comprises: (1) a vinylic crosslinker which comprises one sole polydiorganosiloxane segment and two terminal ethylenically-unsaturated groups selected from the group consisting of (meth)acryloyloxy groups, (meth) acryloylamino groups, vinyl carbonate groups, vinylcarbamate groups; and/or (2) a chain-extended polysiloxane vinylic crosslinker which comprises at least two polydiorganosiloxane segment and a covalent linker between each pair of polydiorganosiloxane segments and two two terminal ethylenically-unsaturated groups selected from the group consisting of (meth)acryloyloxy groups, (meth)acryloylamino groups, vinyl carbonate groups, vinylcarbamate groups.

44. The method of any one of embodiments 1 to 42, the lens-forming composition comprises said at least one polysiloxane vinylic crosslinker which is selected from the group consisting of α-(meth)acryloxypropyl terminated ω-$C_1$-$C_4$-alkyl terminated polydimethylsiloxane, α-(meth)acryloxy-2-hydroxypropyloxypropyl terminated ω-$C_1$-$C_4$-alkyl terminated polydimethylsiloxane, α-(2-hydroxyl-methacryloxypropyloxypropyl)-ω-$C_1$-$C_4$-alkyl-decamethylpentasiloxane, α-[3-(meth)acryloxyethoxy-2-hydroxypropyloxypropyl]-terminated ω—$C_1$-$C_4$-alkyl terminated polydimethylsiloxane, α-[3-(meth)acryloxy-propyloxy-2-hydroxypropyloxypropyl]-terminated ω-$C_1$-$C_4$-alkyl terminated polydimethylsiloxane, α-[3-(meth)acryloxyisopropyloxy-2-hydroxypropyloxypropyl]-terminated ω-$C_1$-$C_4$-alkyl terminated polydimethylsiloxane, α-[3-(meth)acryloxybutyloxy-2-hydroxypropyloxypropyl]-terminated ω-$C_1$—$C_4$-alkyl terminated polydimethylsiloxane, α-[3-(meth)acryloxyethylamino-2-hydroxypropyloxypropyl]-terminated ω-$C_1$-$C_4$-alkyl terminated polydimethylsiloxane, α-[3-(meth)acryloxypropylamino-2-hydroxypropyloxypropyl]-terminated ω-$C_1$-$C_4$-alkyl terminated polydimethylsiloxane, α-[3-(meth)acryloxy-butylamino-2-hydroxypropyloxypropyl]-terminated w-$C_1$-$C_4$-alkyl terminated polydimethylsiloxane, α-(meth)acryloxy (polyethylenoxy)-2-hydroxypropyloxypropyl]-terminated ω-$C_1$-$C_4$-alkyl terminated polydimethylsiloxane, α-[(meth)acryloxy-2-hydroxypropyloxy-ethoxypropyl]-terminated ω-$C_1$-$C_4$-alkyl terminated polydimethylsiloxane, α-[(meth)acryloxy-2-hydroxypropyl-N-ethylaminopropyl]-terminated ω-$C_1$-$C_4$-alkyl terminated polydimethylsiloxane, α-[(meth)acryloxy-2-hydroxypropyl-aminopropyl]-terminated ω-$C_1$-$C_4$-alkyl terminated polydimethylsiloxane, α-[(meth)acryloxy-2-hydroxypropyloxy-(polyethylenoxy) propyl]-terminated ω-$C_1$-$C_4$-alkyl terminated polydimethylsiloxane, α-(meth)acryloylamidopropyloxypropyl terminated ω-$C_1$-$C_4$-alkyl terminated polydimethylsiloxane, α-N-methyl-(meth) acryloylamidopropyloxypropyl terminated ω—$C_1$-$C_4$-alkyl terminated polydimethylsiloxane, α-[3-(meth) acrylamidoethoxy-2-hydroxypropyloxy-propyl]-terminated ω-$C_1$-$C_4$-alkyl polydimethylsiloxane, α-[3-(meth)acrylamidopropyloxy-2-hydroxypropyloxypropyl]-terminated ω-$C_1$-$C_4$-alkyl terminated polydimethylsiloxane, α-[3-(meth)acrylamidoisopropyloxy-2-hydroxypropyloxypropyl]-terminated ω-$C_1$-$C_4$-alkyl terminated polydimethylsiloxane, α-[3-(meth)acrylamidobutyloxy-2-hydroxypropyloxypropyl]-terminated ω—$C_1$-$C_4$-alkyl terminated polydimethylsiloxane, α-[3-(meth)acryloylamido-2-hydroxypropyloxypropyl] terminated ω-$C_1$-$C_4$-alkyl polydimethylsiloxane, α-[3-[N-methyl-(meth) acryloylamido]-2-hydroxypropyloxypropyl] terminated ω-$C_1$-$C_4$-alkyl terminated polydimethylsiloxane, N-methyl-N'-(propyltetra(dimethylsiloxy) dimethylbutylsilane) (meth)acrylamide, N-(2,3-dihydroxypropane)-N'-(propyltetra(dimethylsiloxy) dimethylbutylsilane) (meth)acrylamide, (meth)acryloylamidopropyltetra(dimethylsiloxy) dimethylbutylsilane, α-vinyl carbonate-terminated ω-$C_1$-$C_4$-alkyl-terminated polydimethylsiloxanes, α-vinyl carbamate-terminated ω-$C_1$-$C_4$-alkyl-terminated polydimethylsiloxane, or a mixture thereof.

45. The method of any one of embodiments 1 to 44, wherein the lens-forming composition comprises at least one silicone-containing vinylic monomer of formula (M1) or (M2)

(M1)

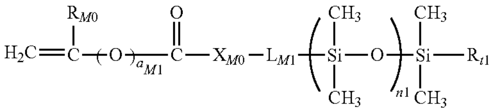

(M2)

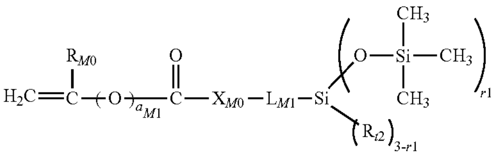

in which: $a_{M1}$ is zero or 1; $R_{M0}$ is H or methyl; $X_{M0}$ is O or $NR_{M1}$; $L_{M1}$ is a $C_2$-$C_8$ alkylene divalent radical or a divalent radical of

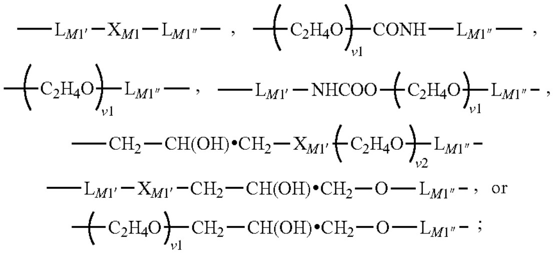

$L_{M1}'$ is a $C_2$-$C_8$ alkylene divalent radical which has zero or one hydroxyl group; $L_{M1}''$ is $C_3$-$C_8$ alkylene divalent radical which has zero or one hydroxyl group; $X_{M1}$ is O, $NR_{M1}$, NHCOO, OCONH, $CONR_{M1}$, or $NR_{M1}CO$; $R_{M1}$ is H or a $C_1$-$C_4$ alkyl having 0 to 2 hydroxyl group; $R_{t1}$ and $R_{t2}$ independent of each other are a $C_1$-$C_6$ alkyl; $X_{M1}'$ is O or $NR_1$; v1 is an integer of 1 to 30; m2 is an integer of 0 to 30; n1 is an integer of 3 to 40; and r1 is an integer of 2 or 3.

46. The method of any one of embodiments 1 to 45, wherein the lens-forming composition comprises tris (trimethylsilyloxy) silylpropyl(meth)acrylate, [3-(meth)acryloxy-2-hydroxypropyloxy] propylbis(trimethylsiloxy)methylsilane, [3-(meth)acryloxy-2- hydroxypropyloxy]propylbis(trimethylsiloxy) butylsilane, 3-(meth)acryloxy-2-(2-hydroxyethoxy)-propyloxy)propylbis(trimethylsiloxy)methylsilane, 3-(meth)acryloxy-2-hydroxypropyloxy)propyltris (trimethylsiloxy) silane, N-[tris(trimethylsiloxy) silyl-propyl]-(meth)acrylamide, N-(2-hydroxy-3-(3-(bis (trimethylsilyloxy)methylsilyl) propyloxy)propyl)-2-methyl (meth)acrylamide, N-(2-hydroxy-3-(3-(bis (trimethylsilyloxy)methylsilyl)-propyloxy)propyl) (meth)acrylamide, N-(2-hydroxy-3-(3-(tris(trimethyl-silyloxy) silyl)-propyloxy)propyl)-2-methyl acrylamide, N-(2-hydroxy-3-(3-(tris(trimethylsilyloxy)-silyl) propyloxy)propyl) (meth)acrylamide, N-[tris(dimethylpropylsiloxy) silylpropyl]-(meth)acrylamide, N-[tris (dimethylphenylsiloxy)-silylpropyl] (meth)acrylamide, N-[tris(dimethylethylsiloxy)-silylpropyl] (meth)acrylamide, N,N-bis[2-hydroxy-3-(3-(bis(trimethylsilyloxy) methylsilyl)-propyloxy)propyl]-2-methyl (meth)acrylamide, N,N-bis[2-hydroxy-3-(3-(bis(trimethylsilyloxy) methylsilyl) propyloxy)-propyl] (meth)acrylamide, N,N-bis[2-hydroxy-3-(3-(tris(trimethylsilyloxy) silyl) propyloxy)-propyl]-2-methyl (meth)acrylamide, N,N-bis[2-hydroxy-3-(3-(tris(trimethylsilyloxy) silyl)-propyloxy)propyl] (meth)acrylamide, N-[2-hydroxy-3-(3-(t-butyldimethylsilyl) propyloxy)-propyl]-2-methyl (meth)acrylamide, N-[2-hydroxy-3-(3-(t-butyldimethylsilyl) propyloxy)-propyl] (meth)acrylamide, N,N-bis [2-hydroxy-3-(3-(t-butyldimethylsilyl) propyloxy)propyl]-2-methyl (meth)acrylamide, N-2-(meth) acryloxyethyl-O-(methyl-bis-trimethylsiloxy-3-propyl) silyl carbamate, 3-(trimethylsilyl) propylvinyl carbonate, 3-(vinyloxycarbonylthio)-propyl-tris(trimethyl-siloxy) silane, 3-[tris(trimethylsiloxy) silyl]propylvinyl carbamate, 3-[tris(trimethylsiloxy) silyl]propyl allyl carbamate, 3-[tris(trimethylsiloxy) silyl] propyl vinyl carbonate, or a combination thereof.

47. The method of any one of embodiments 1 to 46, wherein the lens-forming composition comprises 2-[2'-hydroxy-5'-(2-methacryloxyethyl)phenyl)]-2H-benzotriazole (Norbloc) (i.e., a UV-absorbing vinylic monomer), and at least one polymerizable HEVL-absorbing compound which is 2-{2'-Hydroxy-3'-tert-butyl-5'-[3'-methacryloyloxypropoxy]phenyl}-2H-benzotriazole, 2-{2'-Hydroxy-3'-tert-butyl-5'-[3'-methacryloyloxy-propoxy]phenyl}-5-methoxy-2H-benzotriazole (UV13), 2-{2'-Hydroxy-3'-tert-butyl-5'-[3'-methacryloyloxypropoxy]phenyl}-5-chloro-2H-benzotriazole (UV28), 2-[2'-Hydroxy-3'-tert-butyl-5'-(3'-acryloyloxypropoxy)phenyl]-5-trifluoromethyl-2H-benzotriazole (UV23), a soluble polymerizable Cu (II)-porphyrin, or combinations thereof.

48. The method of any one of embodiments 1 to 47, wherein the lens-forming composition comprises at least one non-silicone vinylic crosslinker.

49. The method of embodiment 48, wherein said at least one non-silicone vinylic crosslinker comprises ethyleneglycol di-(meth)acrylate, diethyleneglycol di-(meth)acrylate, triethyleneglycol di-(meth)acrylate, tetraethyleneglycol di-(meth)acrylate, glycerol di-(meth) acrylate, 1,3-propanediol di-(meth)acrylate, 1,3-butanediol di-(meth)acrylate, 1,4-butanediol di-(meth) acrylate, glycerol 1,3-diglycerolate di-(meth)acrylate, ethylenebis[oxy (2-hydroxypropane-1,3-diyl)] di-(meth)acrylate, bis[2-(meth)acryloxyethyl] phosphate, trimethylolpropane di-(meth)acrylate, and 3,4-bis [(meth)acryloyl] tetrahydrofuan, diacrylamide, dimethacrylamide, N,N-di(meth)acryloyl-N-methylamine, N,N-di(meth)acryloyl-N-ethylamine, N,N'-methylene bis(meth)acrylamide, N,N'-ethylene bis(meth)acrylamide, N,N'-dihydroxyethylene bis(meth)acrylamide, N,N'-propylene bis(meth)acrylamide, N,N'-2-hydroxypropylene bis(meth)acrylamide, N,N'-2,3-dihydroxybutylene bis(meth)acrylamide, 1,3-bis(meth)acrylamidepropane-2-yl dihydrogen phosphate, piperazine diacrylamide, tetraethyleneglycol divinyl ether, triethyleneglycol divinyl ether, diethyleneglycol divinyl ether, ethyleneglycol divinyl ether, triallyl isocyanurate, triallyl cyanurate, trimethylopropane trimethacrylate, pentaerythritol tetramethacrylate, bisphenol A dimethacrylate, allylmethacrylate, allylacrylate, N-allyl-methacrylamide, N-allyl-acrylamide, or combinations thereof.

50. The method of any one of embodiments 1 to 49, wherein the lens-forming composition comprises at least one blending vinylic monomer.

51. The method of embodiment 50, wherein said at least one blending vinylic monomer comprises $C_1$-$C_{10}$ alkyl (meth)acrylate, cyclopentylacrylate, cyclohexylmethacrylate, cyclohexylacrylate, isobornyl(meth)acrylate, styrene, 4,6-trimethylstyrene (TMS), t-butyl styrene (TBS), trifluoroethyl(meth)acrylate, hexafluoro-isopropyl(meth)acrylate, hexafluorobutyl(meth)acrylate, or combinations thereof.

52. The method of any one of embodiments 1 to 51, wherein the lens-forming composition comprises at least one photochromic compound.

53. The method of embodiment 52, wherein said at least one photochromic compound comprises a naphthopyran, an indeno-fused naphthopyran (i.e., indeno-naphthopyran), a heterocyclic ring-fused naphthopyrian, a benzopyran, a phenanthropyran, a quinopyran, a quinolinopyran, a fluoroanthenopyran, an anthracene-fused pyran, a tetracene-fused pyran, a spiro(benzindoline) naphthopyran, a spiro(indoline) naphthopyran, a spiro(indoline) benzopyran, a spiro(indoline) quinopyran, a spiro(indoline) pyran, a naphthoxazine, a spirobenzopyran, a spirobenzothiopyran, a naphthacenedione, a benzoxazine, a spirooxazine, a naphthoxazine, a spiro(benzindoline) naphthoxazine, a spiro (indoline) naphthoxazine, a spiro(indoline) pyridobenzoxazine, a spiro(indoline) benzoxazine, a spiro (benzindoline) benzoxazine, a spiro(benzindoline) pyridobenzoxazine, a spiro(indoline) fluoranthenoxazine, a spiro(indoline)-quinoxazine, a spiropiperidine-naphthopyran, a piro (indoline) pyronobenzoxazinone, a benzospiropyran, a naphthospiropyran, a spirobenzoxazine-pyrrolopyridine, a spironaphthoxazine-pyrrolopyrridine, a spiro-oxazepin-benzoxazine, a spiro-oxazepin-naphthoxazine, a spiro(indoline) benzothiazoloxazine, a spiro(indoline) benzopyrroloxazine, a spiro(indoline) quinazolinooxazine, a spiro(indoline)-anthracenobenzoxazine, a benzofurobenzopyran, a benzothienobenzopyran, a naphthofurobenzopyran, a benzopyrano-fused naphthopyran, a spiro(isoindoline)-naphthoxazine, a spiro (isoindoline) benzoxazine, or a mixture thereof.

54. The method of embodiment 43, wherein said at least one photochromic compound is polymerizable (i.e., comprising an ethylenicaly-unsaturated group).

55. The method of any one of embodiments 1 to 54, wherein said at least one acyltin photoinitiator comprises tetrakis(2,4,6-trimethylbenzoyl) stannane.

56. The method of any one of embodiments 1 to 55, wherein the lens-forming composition comprises a vinylic crosslinker selected from the group consisting of N,N'-methylene-bis-(meth)acrylamide, N,N'-ethylene-bis-(meth)acrylamide, N,N'-dihydroxyethylene-bis-(meth)acrylamide, 1,3-bis(acrylamidopropyl)-1,1,3,3-tetramethyldisiloxane, 1,3-bis(methacrylamidopropyl)-1,1,3,3-tetramethyldisiloxane, and combinations thereof.

57. A UV- and HEVL-absorbing silicone hydrogel contact lens obtained according to the method of any one of embodiments 1 to 56.

58. The UV- and HEVL-absorbing silicone hydrogel contact lens of embodiment 57, wherein the contact lens has: an oxygen permeability of at least about 40 barrers (preferably at least about 60 barrers, more preferably at least about 80 barrers) (at about 35° C.); an elastic modulus of about 2.0 MPa or less (preferably about 1.5 MPa or less, more preferably about 1.2 or less, even more preferably from about 0.4 MPa to about 1.0 MPa) (at room temperature, about 22° C. to 28° C.); and/or a water content of from about 15% to about 70% (preferably from about 20% to about 50% by weight) (at room temperature, about 22° C. to 28° C.) when fully hydrated.

The previous disclosure will enable one having ordinary skill in the art to practice the invention. Various modifications, variations, and combinations can be made to the various embodiment described herein. In order to better enable the reader to understand specific embodiments and the advantages thereof, reference to the following examples is suggested. It is intended that the specification and examples be considered as exemplary.

Example 1

Oxygen Permeability Measurements

Unless specified, the oxygen transmissibility (Dk/t), the intrinsic (or edge-corrected) oxygen permeability ($Dk_i$ or $Dk_c$) of a lens and a lens material are determined according to procedures described in ISO 18369-4.

Equilibrium Water Content

The equilibrium water content (EWC) of contact lenses is determined as follows.

Amount of water (expressed as percent by weight) present in a hydrated hydrogel contact lens, which is fully equilibrated in PBS (phosphate buffered saline), is determined at room temperature. Quickly stack the lenses, and transfer the lens stack to the aluminum pan on the analytical balance after blotting lens in a cloth. The number of lenses for each sample pan is typically five (5). Record the pan plus hydrated weight of the lenses. Cover the pan with aluminum foil. Place pans in a laboratory oven at 100±2° C. to dry for 16-18 hours. Remove pan plus lenses from the oven and cool in a desiccator for at least 30 minutes. Remove a single pan from the desiccator, and discard the aluminum foil. Weigh the pan plus dried lens sample on an analytical balance. Repeat for all pans. The wet and dry weight of the lens samples can be calculated by subtracting the weight of the empty weigh pan.

Elastic Modulus

The elastic modulus of a contact lens is determined using a MTS insight instrument. The contact lens is first cut into a 3.12 mm wide strip using Precision Concept two stage cutter. Five thickness values are measured within 6.5 mm gauge length. The strip is mounted on the instrument grips and submerged in PBS (phosphate buffered saline) with the temperature controlled at 21±2° C. Typically 5N Load cell is used for the test. Constant force and speed are applied to the sample until the sample breaks. Force and displacement data are collected by the TestWorks software. The elastic modulus value is calculated by the TestWorks software which is the slope or tangent of the stress vs. strain curve near zero elongation, in the elastic deformation region.

Transmittance

Contact lenses are manually placed into a specially fabricated sample holder or the like which can maintain the shape of the lens as it would be when placing onto eye. This holder is then submerged into a 1 cm path-length quartz cell containing phosphate buffered saline (PBS, PH ~7.0-7.4) as the reference. A UV/visible spectrpohotmeter, such as, Varian Cary 3E UV-Visible Spectrophotometer with a LabSphere DRA-CA-302 beam splitter or the like, can be used in this measurement. Percent transmission spectra are collected at a wavelength range of 250-800 nm with % T values collected at 1.0 nm intervals. This data is transposed onto an Excel spreadsheet and used to determine if the lenses conform to Class 1 UV absorbance. Transmittance is calculated using the following equations:

UVA % T=Average % Transmission between 315 nm and 380 nm×100

UVB % T=Average % Transmission between 280 nm and 315 nm×100

Violet % T=Average % Transmission between 380 nm and 440 nm×100.

Photo-rheology: The photo-rheology experiment measures the elastic (G') and viscous modulus (G") as a function of time during curing. The experiment is conducted by using an appropriate light source, optionally cutoff filters to select wavelengths of interest, and a rheometer. For example, a light source can be a LEDs (450 or 472 nm; at a specified total irradiance, e.g., 55 $mW/cm^2$). The sample (i.e., a polymerizable composition) is placed between a quartz plate that allows the actinic radiation (i.e., the blue light) to pass through and the rheometer. The curing time of a polymerizable composition is determined when the elastic modulus (G') reaches a plateau.

Chemicals

CE-PDMS represents a polysiloxane vinylic crosslinker which has three polydimethylsiloxane (PDMS) segments linked via diurethane linkages between two PDMS segments and two urethane linkages each located between one terminal methacrylate group and one PDMS segment and is prepared according to method similar to what described in Example 2 of U.S. Pat. No. 9,315,669; PrOH represents 1-propanol; TRIS-Am represents N-[tris(trimethylsiloxy)-silylpropyl]acrylamide; DMA represent N,N-dimethylacrylamide; H-TEMPO represents 4-hydroxy-2,2,6,6-tetramethylpiperidin-1-oxyl; L-PEG 2000 represents N-(carbonyl-methoxypolyethylene glycol-2000)-1,2-disteaoyl-sn-glycero-3-phosphoethanolamin, sodium salt; DMPC represents 1,2-dimyristoyl-sn-glycero-3-phosphocholine; Ge PI represent Bis(4-methoxybenzoyl) diethylgermanium; DMAc represents dimethylacetamide; Cu-TBP-MAm represents Cu (II)-tetra-(dimethylaminopropylmethacrylamidophenyl) porphine; Norbloc is 2-[3-(2H-Benzotriazol-2-yl)-4-hydroxyphenyl]ethyl methacrylate from Aldrich; UV28 represents 2-{2'-Hydroxy-3'-tert-butyl-5'-[3'-methacryloyloxypropoxy]phenyl}-5-chloro-2H-benzotriazole, Sn—PI represents tetrakis(2,4,6-trimethylbenzoyl) stannane.

Example 2

PAA-coating solution. A polyacrylic acid (PAA) coating solution is prepared by dissolving an amount of PAA (M.W.:

450 kDa, from Lubrizol) in a given volume of 1-propanol (1-PrOH) to have a concentration of about 0.44% by weight and the pH is adjusted with formic acid to about 2.0.

Preparation of In-Package-Coating solution (IPC saline). Poly(AAm-co-AA) (90/10) partial sodium salt (~90% solid content, poly(AAm-co-AA) 90/10, Mw 200,000) is purchased from Polysciences, Inc. and used as received. Polyamidoamine epichlorohydrin (PAE) (Kymene, an azetidinium content of 0.46 assayed with NMR) is purchased from Ashland as an aqueous solution and used as received. IPC saline is prepared by dissolving about 0.07% w/w of poly(AAm-co-AA) (90/10) and about 0.10% of PAE (an initial azetidinium millimolar equivalents of about 8.8 millimole) in phosphate-buffered saline (PBS) (about 0.044 w/w % $NaH_2PO_4 \cdot H_2O$, about 0.388 w/w/% $Na_2HPO_4 \cdot 2H_2O$, about 0.79 w/w % NaCl) and adjusting the pH to 7.2~7.6. Then the IPC saline is heat pre-treated for about 6 hours at about 60° C. (heat pretreatment). During this heat pretreatment, poly(AAm-co-AA) and PAE are partially crosslinked to each other (i.e., not consuming all azetidinium groups of PAE) to form a water-soluble and thermally-crosslinkable hydrophilic polymeric material containing azetidinium groups within the branched polymer network in the IPC saline. After the heat pre-treatment, the IPC is cooled to room temperature then filtered using a 0.22 micron PES membrane filter.

Preparation of Lens Formulations

Two lens-forming compositions are prepared as follows (amount Unit: weight part):

Formulation A: CE-PDMS (31.63); TRIS-Am (19.77); DMA (23.27); PROH (23.33); H-TEMPO (0.04); L-PEG 2000 (0.61); DMPC (0.76); Norbloc (0.9); Ge-PI (0.6).

Formulation B: CE-PDMS (31.63); TRIS-Am (19.77); DMA (23.27); PrOH (11.67); DMAc (11.66); H-TEMPO (0.04); L-PEG 2000 (0.61); DMPC (0.76); Norbloc (0.9); Sn—PI (1.0).

Photorheology Studies

Photo-rheology experiments are carried out according to the procedures described in Example 1. LEDs of 450 nm and 472 nm at similar total irradiances (~55 mW/cm$^2$) are used. Sn—PI based formulation is hazy at room temperature but it is clear when warmed up to 35° C. It has been kept at 35° C. and the temperature of rheometer plate is also increased to 35° C. Ge-PI based formulation is clear at 25° C. Results are shown in FIG. 1.

Lens Fabrication

Figure 2:
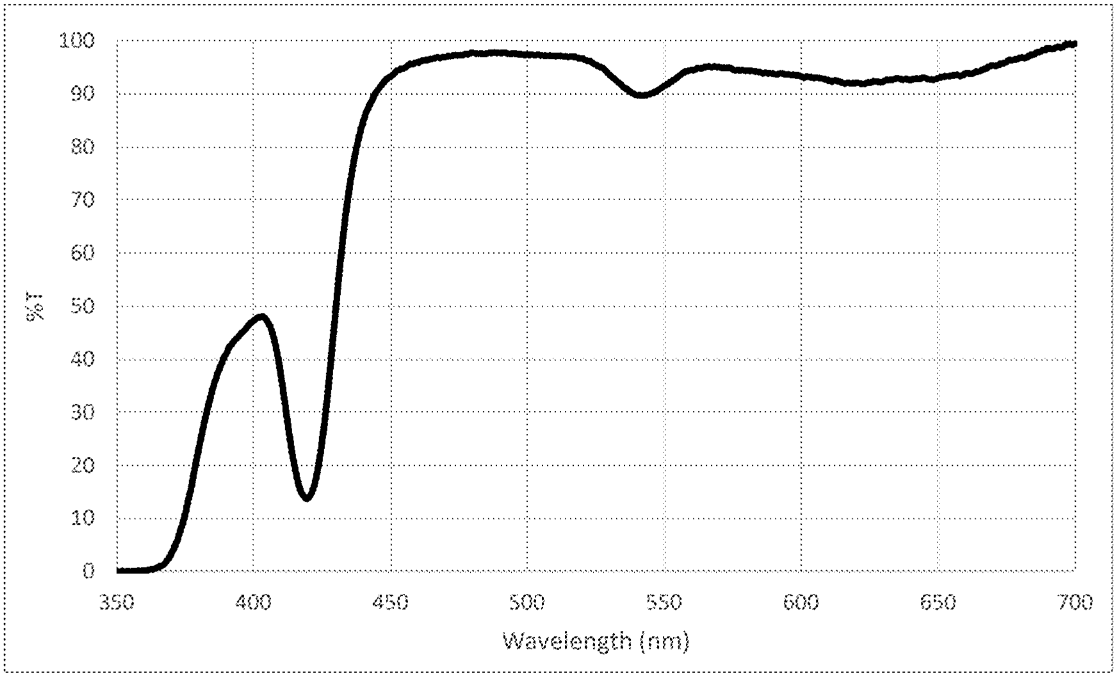
FIG. 2 shows UV/Vis spectrum of the SiHy contact lenses prepared according to a method of invention.

Lenses are prepared by cast-molding from the lens-forming composition (Formulation B) prepared above in a reusable mold (quartz female mold half and glass male mold half), similar to the mold shown in FIGS. 1-6 in U.S. Pat. Nos. 7,384,590 and 7,387,759 (FIGS. 1-6). Lens formulation B in the molds is cured for 60 seconds with 472 nm LED light at an intensity of 56.6 mW/cm$^2$. After demolding and delensing, cast-molded contact lenses are then extracted by dipping in the following series of baths: deionized (DI) water bath (about 56 seconds); 6 methyl ethyl ketone (MEK) baths (about 44, 56, 56, 56, 56, and 56 second respectively). After lens extraction, the lenses are in contact for 100 seconds with the PAA-coating solution prepared above to form a PAA coating on each lens, then equilibrated into water, and then placed into polypropylene shells containing 0.65 mL of IPC saline prepared above and autoclaved for 45 minutes at 121° C. The resultant lenses have an elastic modulus of about 0.54 MPa and an equilibrium water content of about 32.7%. The UV/Vis spectrum is shown in FIG. 2. It contains 350 ppm of Cu-TBP-MAm (HEVL blocker) and 0.1% of UV28 (UV blocker).

All the publications and patents which have been cited herein above are hereby incorporated by reference in their entireties.

What is claimed is:

1. A method for producing UV-absorbing silicone hydrogel contact lenses, the method comprising the steps of:

(1) providing a mold for making a soft contact lens, wherein the mold has a first mold half with a first molding surface defining the anterior surface of a contact lens and a second mold half with a second molding surface defining the posterior surface of the contact lens, wherein said first and second mold halves are configured to receive each other such that a cavity is formed between said first and second molding surfaces;

(2) introducing a lens-forming composition into the cavity, wherein the lens-forming composition comprises (i) at least one hydrophilic vinylic monomer, (ii) at least one siloxane-containing vinylic monomer and/or at least one polysiloxane vinylic crosslinker, (iii) at least one polymerizable UV-absorbing compound and at least one polymerizable HEVL-absorbing compound in amounts sufficient to provide the lens-forming composition with an average UVB transmittance of about 10% or less between 280 and 315 nanometers, an average UVA transmittance of about 30% or less between 315 and 380 nanometers, and an average Violet transmittance of about 70% or less between 380 nm and 440 nm, (iv) from about 0.05% to about 1.5% by weight of at least one acyltin photoinitiator capable of initiating a free-radical polymerization under irradiation with a light source including a light in the region of from 455 nm to 510 nm, (v) at least one photochromic compound that is polymerizable and comprises an ethylenicaly-unsaturated group; and (3) irradiating the lens-forming composition in the mold by using the light source including a light in a region of from 455 nm to 510 nm, so as to form the UV- and HEVL-absorbing silicone hydrogel contact lens, wherein the formed UV-absorbing silicone hydrogel contact lens has a UVB transmittance of about 10% or less between 280 and 315 nanometers and a UVA transmittance of about 30% or less between 315 and 380 nanometers and and the Violet transmittance of about 70% or less between 380 nm and 440 nm.

2. The method of claim 1, wherein said at least one polymerizable UV-absorbing compound and said at least one polymerizable HEVL-absorbing compound are present in amounts sufficient to provide the lens-forming composition with an average UVB transmittance of about 1% or less between 280 and 315 nanometers, an average UVA transmittance of about 5% or less between 315 and 380 nanometers, and an average Violet transmittance of about 40% or less between 380 nm and 440 nm.

3. The method of claim 2, wherein said at least one hydrophilic vinylic monomer comprises: (1) an alkyl (meth)acrylamide selected from the group consisting of (meth)acrylamide, N,N-dimethyl (meth)acrylamide, N-ethyl (meth)acrylamide, N,N-diethyl (meth)acrylamide, N-propyl (meth)acrylamide, N-isopropyl (meth)acrylamide, N-3-methoxypropyl (meth)acrylamide, and combinations thereof; (2) a hydroxyl-containing acrylic monomer selected from the group consisting of N-2-hydroxylethyl (meth)acrylamide, N,N-bis(hydroxyethyl) (meth)acrylamide, N-3-hydroxypropyl (meth)acrylamide, N-2-hydroxypropyl (meth)acrylamide, N-2,3-dihydroxypropyl (meth)acrylamide, N-tris(hydroxymethyl) methyl (meth)acrylamide, 2-hydroxyethyl(meth)acrylate, 3-hydroxypropyl(meth)acrylate, 2-hydroxypropyl(meth)acrylate, glycerol methacrylate (GMA), di(ethylene glycol) (meth)acrylate, tri(ethylene glycol) (meth)acrylate, tetra(ethylene glycol) (meth)acrylate, poly(ethylene glycol) (meth)acrylate having a number average molecular weight of up to 1500, poly(ethylene glycol) ethyl (meth)acrylamide having a number average molecular weight of up to 1500, and combinations thereof; (3) a carboxyl-containing acrylic monomer selected from the group consisting of 2-(meth)acrylamidoglycolic acid, (meth)acrylic acid, ethylacrylic acid, 3-(meth)acrylamidopropionic acid, 5-(meth)acrylamidopentanoic acid, 4-(meth) acrylamido-butanoic acid, 3-(meth)acrylamido-2-methylbutanoic acid, 3-(meth)acrylamido-3-methylbutanoic acid, 2-(meth)acrylamido-2-methyl-3,3-dimethyl butanoic acid, 3-(meth)acrylamidohaxanoic acid, 4-(meth)acrylamido-3,3-dimethylhexanoic acid, and combinations thereof; (4) an amino-containing acrylic monomer selected from the group consisting of N-2-aminoethyl (meth)acrylamide, N-2-methylaminoethyl (meth)acrylamide, N-2-ethylaminoethyl (meth)acrylamide, N-2-dimethylaminoethyl (meth)acrylamide, N-3-aminopropyl (meth)acrylamide, N-3-methylaminopropyl (meth)acrylamide, N-3-dimethylaminopropyl (meth) acrylamide, 2-aminoethyl(meth)acrylate, 2-methylaminoethyl(meth)acrylate, 2-ethylaminoethyl(meth)acrylate, 3-aminopropyl(meth)acrylate, 3-methylaminopropyl(meth) acrylate, 3-ethylaminopropyl(meth)acrylate, 3-amino-2-hydroxypropyl(meth)acrylate, trimethylammonium 2-hydroxy propyl (meth)acrylate hydrochloride, dimethylaminoethyl (meth)acrylate, and combinations thereof; (5) an N-vinyl amide monomer selected from the group consisting of N-vinylpyrrolidone, N-vinyl-3-methyl-2-pyrrolidone, N-vinyl-4-methyl-2-pyrrolidone, N-vinyl-5-methyl-2-pyrrolidone, N-vinyl-6-methyl-2-pyrrolidone, N-vinyl-3-ethyl-2-pyrrolidone, N-vinyl-4,5-dimethyl-2-pyrrolidone, N-vinyl-5,5-dimethyl-2-pyrrolidone, N-vinyl-3,3,5-trimethyl-2-pyrrolidone, N-vinyl piperidone, N-vinyl-3-methyl-2-piperidone, N-vinyl-4-methyl-2-piperidone, N-vinyl-5-methyl-2-piperidone, N-vinyl-6-methyl-2-piperidone, N-vinyl-6-ethyl-2-piperidone, N-vinyl-3,5-dimethyl-2-piperidone, N-vinyl-4,4-dimethyl-2-piperidone, N-vinyl caprolactam, N-vinyl-3-methyl-2-caprolactam, N-vinyl-4-methyl-2-caprolactam, N-vinyl-7-methyl-2-caprolactam, N-vinyl-7-ethyl-2-caprolactam, N-vinyl-3,5-dimethyl-2-caprolactam, N-vinyl-4,6-dimethyl-2-caprolactam, N-vinyl-3,5,7-trimethyl-2-caprolactam, N-vinyl-N-methyl acetamide, N-vinyl formamide, N-vinyl acetamide, N-vinyl isopropylamide, N-vinyl-N-ethyl acetamide, N-vinyl-N-ethyl formamide, and mixtures thereof; (6) a methylene-containing pyrrolidone monomer selected from the group consisting of 1-methyl-3-methylene-2-pyrrolidone, 1-ethyl-3-methylene-2-pyrrolidone, 1-methyl-5-methylene-2-pyrrolidone, 1-ethyl-5-methylene-2-pyrrolidone, 5-methyl-3-methylene-2-pyrrolidone, 5-ethyl-3-methylene-2-pyrrolidone, 1-n-propyl-3-methylene-2-pyrrolidone, 1-n-propyl-5-methylene-2-pyrrolidone, 1-isopropyl-3-methylene-2-pyrrolidone, 1-isopropyl-5-methylene-2-pyrrolidone, 1-n-butyl-3-methylene-2-pyrrolidone, 1-tert-butyl-3-methylene-2-pyrrolidone, and combinations thereof; (7) an acrylic monomer having a $C_1$-$C_4$ alkoxyethoxy group and selected from the group consisting of ethylene glycol methyl ether (meth)acrylate, di(ethylene glycol)methyl ether (meth)acrylate, tri(ethylene glycol)methyl ether (meth)acrylate, tetra(ethylene glycol)methyl ether (meth)acrylate, $C_1$-$C_4$-alkoxy poly(ethylene glycol) (meth)acrylate having a number average molecular weight of up to 1500, methoxy-poly(ethylene glycol)ethyl (meth) acrylamide having a number average molecular weight of up to 1500, and combinations thereof; (8) a vinyl ether monomer selected from the group consisting of ethylene glycol monovinyl ether, di(ethylene glycol) monovinyl ether, tri (ethylene glycol) monovinyl ether, tetra(ethylene glycol) monovinyl ether, poly(ethylene glycol) monovinyl ether, ethylene glycol methyl vinyl ether, di(ethylene glycol)methyl vinyl ether, tri(ethylene glycol)methyl vinyl ether, tetra(ethylene glycol)methyl vinyl ether, poly(ethylene glycol)methyl vinyl ether, and combinations thereof; (9) an allyl ether monomer selected from the group consisting of ethylene glycol monoallyl ether, di(ethylene glycol) monoallyl ether, tri(ethylene glycol) monoallyl ether, tetra(ethylene glycol) monoallyl ether, poly(ethylene glycol) monoallyl ether, ethylene glycol methyl allyl ether, di(ethylene glycol)methyl allyl ether, tri(ethylene glycol)methyl allyl ether, tetra(ethylene glycol)methyl allyl ether, poly(ethylene glycol)methyl allyl ether, and combinations thereof; (10) a phosphoryl-choline-containing vinylic monomer selected from the group consisting of (meth)acryloxy-ethyl phosphorylcholine, (meth)acryloyloxypropyl phosphorylcholine, 4-(meth)acryloxy)-butyl-2'-(trimethyl-ammonio)ethylphosphate, 2-[(meth)acryloylamino]ethyl-2'-(trimethyl-ammonio)-ethyl-phosphate, 3-[(meth)acryloylamino]propyl-2'-(trimethylammonio)ethyl-phosphate, 4-[(meth) acryloylamino]butyl-2'-(trimethylammonio)ethylphosphate, 5-((meth)acryloxy)-pentyl-2'-(trimethylammonio)ethyl phosphate, 6-((meth)acryloyloxy) hexyl-2'-(trimethyl-ammonio)-ethylphosphate, 2-((meth)acryloyloxy)ethyl-2'-(triethylammonio)-ethylphosphate, 2-((meth)acryloyloxy) ethyl-2'-(tripropylammonio)ethylphosphate, 2-((meth) acryloxy)ethyl-2'-(tributylammonio)ethyl phosphate, 2-((meth)acryloyloxy) propyl-2'-(trimethylammonio)-ethylphosphate, 2-((meth)acryloyloxy)butyl-2'-(trimethylammonio)-ethylphosphate, 2-((meth)acryloyloxy) pentyl-2'-(trimethylammonio)ethylphosphate, 2-((meth)acryloyloxy) hexyl-2'-(trimethylammonio)ethyl phosphate, 2-(vinyloxy) ethyl-2'-(trimethylammonio)ethylphosphate, 2-(allyloxy) ethyl-2'-(trimethylammonio)ethylphosphate, 2-(vinyloxycarbonyl)ethyl-2'-(trimethylammonio)ethyl phosphate, 2-(allyloxy-carbonyl)ethyl-2'-(trimethylammonio)-ethylphosphate, 2-(vinylcarbonylamino)-ethyl-2'-(trimethylammonio)ethylphosphate, 2-(allyloxycarbonylamino)ethyl-2'-(trimethyl-ammonio)ethyl phosphate, 2-(butenoyloxy) ethyl-2'-(trimethylammonio)ethylphosphate, and combinations thereof; (11) allyl alcohol; (12) N-2-hydroxyethyl vinyl carbamate; (13) N-carboxyvinyl-β-alanine (VINAL); (14) N-carboxyvinyl-α-alanine; (15) or combinations thereof.

4. The method of claim 3, wherein the lens-forming composition comprises said at least one siloxane-containing vinylic monomer which comprises a siloxane-containing (meth)acrylamido monomer, a siloxane-containing (meth) acryloxy monomer, a siloxane-containing vinyloxycarbonyloxy monomer, a siloxane-containing vinyloxy-carbonylamino monomer, a siloxane-containing vinylaminocarbonylamino monomer, a siloxane-containing vinylaminocarbonyloxy monomer, or combination thereof, where each of said at least one siloxane-containing vinylic monmer comprises a bis(trialkylsilyloxy)-alkylsilyl group, a tris(trialkylsilyloxy)-silyl group, or a polysiloxane chain having 2 to 30 siloxane units and terminated with an alkyl, hydroxyalkyl or methoxyalkyl group.

5. The method of claim 3, wherein the lens-forming composition comprises (i)(a) at least one hydrophilic (meth) acrylamido monomer, (ii)(a) at least one siloxane-containing (meth)acrylamido monomer, (ii)(b) at least one polysiloxane vinylic crosslinker, (iii) said at least one polymerizable UV-absorbing compound and said at least one polymerizable HEVL-absorbing compound, and (iv) from about 0.05% to about 1.5% by weight of at least one an acyltin photoinitiator capable of initiating a free-radical polymerization under irradiation with a light source including a light in the region of about 455 to about 510 nm, wherein the sum of the amounts of components (i)(a), (ii)(a), (ii)(b), (iii) and (iv) is at least 90% by weight relative to total amount of all polymerizable components in the lens-forming composition, wherein the lens-forming composition has a curing time of about 60 seconds or less as determined in photo-rheology study using a LED light source which provide a visible light with a spectral centroid of about 472 nm and a total irradiance of about 55 $mW/cm^2$.

6. The method of claim 5, wherein the lens-forming composition in the mold is irradiated for about 70 second or less.

7. The method of claim 5, wherein the mold is a reusable mold, wherein the step of irradiating is performed under a spatial limitation of actinic radiation, wherein the formed UV- and HEVL-absorbing silicone hydrogel contact lens comprises a lens edge defined by the spatial limitation of actinic radiation.

8. The method of claim 6, wherein the mold is a reusable mold, wherein the step of irradiating is performed under a spatial limitation of actinic radiation, wherein the formed UV- and HEVL-absorbing silicone hydrogel contact lens comprises a lens edge defined by the spatial limitation of actinic radiation.

9. The method of claim 5, wherein said at least one hydrophilic (meth)acrylamido monomer comprises (meth) acrylamide, N, N-dimethyl (meth)acrylamide, N-ethyl (meth)acrylamide, N,N-diethyl (meth)acrylamide, N-propyl (meth)acrylamide, N-isopropyl (meth)acrylamide, N-3-methoxypropyl (meth)acrylamide, N-2-hydroxylethyl (meth)acrylamide, N,N-bis(hydroxyethyl) (meth)acrylamide, N-3-hydroxypropyl (meth)acrylamide, N-2-hydroxypropyl (meth)acrylamide, N-2,3-dihydroxypropyl (meth) acrylamide, N-4-hydroxybutyl (meth)acrylamide, N,N-bis (2-hydroxyethyl) (meth)acrylamide, N-tris(hydroxymethyl) methyl (meth)acrylamide, 2-(meth)acrylamido-glycolic acid, 3-(meth)acrylamido-propionic acid, 4-(meth)acrylamido-butanoic acid, 3-(meth)acrylamido-2-methylbutanoic acid, 3-(meth)acrylamido-3-methylbutanoic acid, 2-(meth)acrylamido-2-methyl-3,3-dimethyl butanoic acid, 5-(meth)acrylamidopentanoic acid, 3-(meth)acrylamidohaxanoic acid, 4-(meth)acrylamido-3,3-dimethylhexanoic acid, (3-(meth)acrylamidophenyl) boronic acid, 3-((3-methacrylamidopropyl)dimethylammonio)-propane-1-sulfonate; 3-((3-acrylamidopropyl)dimethylammonio) propane-1-sulfonate, N-2-aminoethyl (meth)acrylamide, N-2-methylaminoethyl (meth)acrylamide, N-2-ethyl-aminoethyl (meth) acrylamide, N-2-dimethylaminoethyl (meth)acrylamide, N-3-aminopropyl (meth)acrylamide, N-3-methylaminopropyl (meth)acrylamide, N-3-dimethylaminopropyl (meth) acrylamide, poly(ethylene glycol)ethyl (meth)acrylamide having a number average molecular weight of up to 700, methoxy-poly(ethylene glycol)ethyl (meth)acrylamide having a number average molecular weight of up to 700, or combination thereof.

10. The method of claim 9, wherein said at least one siloxane-containing (meth)acrylamido monomer comprises a (meth)acrylamido monomer containing a tris(trialkylsiloxy) silyl group or a bis(trialkylsilyloxy)alkylsilyl group.

11. The method of claim 10, wherein the (meth)acrylamido monomer containing a tris(trialkylsiloxy) silyl group is N-[tris(trimethylsiloxy) silylpropyl] (meth)acrylamide, N-[tris(dimethylethylsiloxy)-silylpropyl] (meth)acrylamide, N-[tris(dimethylpropylsiloxy)-silylpropyl]acrylamide, N-[tris(dimethylphenylsiloxy)silylpropyl] (meth)acrylamide, N-(2-hydroxy-3-(3-(tris(trimethylsilyloxy)silyl)propyloxy)propyl)-2-methyl acrylamide, N-(2-hydroxy-3-(3-(tris (trimethylsilyloxy)silyl)propyloxy)propyl) acrylamide, N,N-bis[2-hydroxy-3-(3-(tris(trimethylsilyloxy)silyl)propyloxy)propyl]-2-methyl acrylamide, N,N-bis[2-hydroxy-3-(3-(tris(trimethylsilyloxy)silyl)propyloxy)propyl]acrylamide, or a combination thereof, wherein the (meth)acrylamido monomer containing a bis(trialkylsilyloxy)alkylsilyl group is N-(2-hydroxy-3-(3-(bis(trimethylsilyloxy)methylsilyl)-propyloxy)propyl)-2-methyl acrylamide, N-(2-hydroxy-3-(3-(bis(trimethylsilyloxy)-methylsilyl) propyloxy)propyl) acrylamide, N,N-bis[2-hydroxy-3-(3-(bis(trimethylsilyloxy)-methylsilyl) propyloxy)propyl]-2-methyl acrylamide, N,N-bis[2-hydroxy-3-(3-(bis(trimethylsilyloxy)methylsilyl) propyloxy)propyl]acrylamide, N-[2-hydroxy-3-(3-(t-butyldimethylsilyl) propyloxy)propyl]-2-methyl acrylamide, a siloxane-containing (meth)acrylamido monomer of one of formula (Ia) to (Ih)

(Ia)

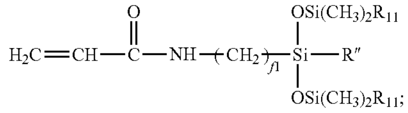

(Ib)

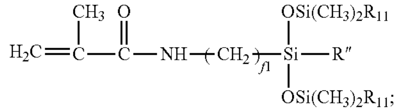

(Ic)

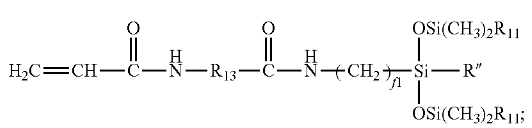

(Id)

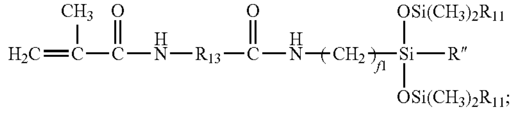

(Ie)

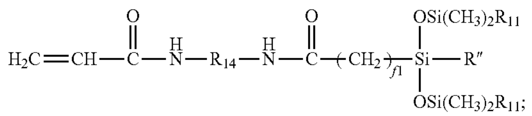

(If)

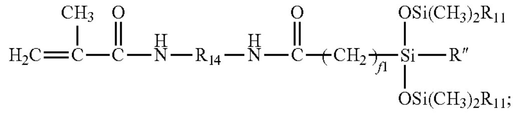

(Ig)

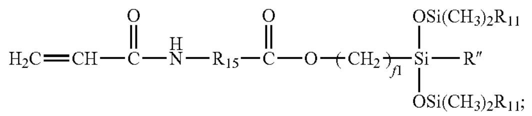

-continued (Ih)

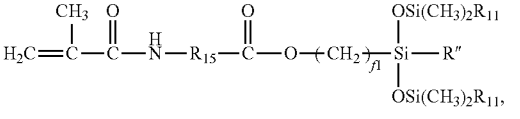

in which $R_{13}$ is a divalent alkylene radical of $—CH_2CH_2—$, $—CH_2CH_2CH_2—$, $—CH_2CH_2CH_2CH_2—$, 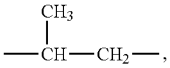,

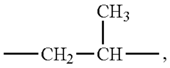, 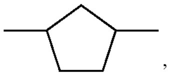, 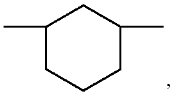,

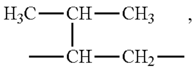, 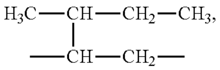,

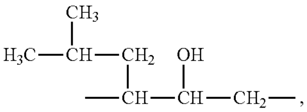 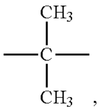,

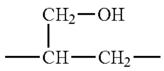, 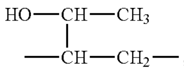, or

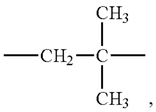, $R_{14}$ is a divalent alkylene radical of $—CH_2CH_2—$ or $—CH_2CH_2CH_2—$, and $R_{15}$ is a divalent alkylene radical of

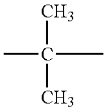 or 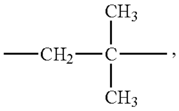, R", and $R_{11}$ independent of each other is $C_1$-$C_4$ alkyl, and f1 is an integer of from 3 to 5.

12. The method of claim 9, wherein said at least one siloxane-containing (meth)acrylamido monomer comprises a mono-(meth)acrylamido-terminated oligo- or polysiloxane of formula (IIa)

(IIa)

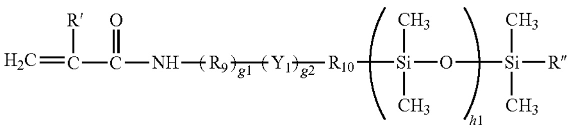

in which R' is hydrogen or methyl, R" independent of each other is $C_1$-$C_6$ alkyl, g1 and g2 independent of each other are integer of 0 or 1, h1 is an integer of 2 to 25, $R_9$ and $R_{10}$ independent of each other are a substituted or unsubstituted $C_1$-$C_{10}$ alkylene divalent radical, $Y^1$ is a linkage of

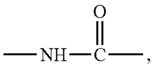, 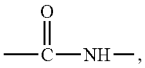, or 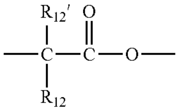

in which $R_{12}$ and $R_{12}$' independent of each other are $C_1$-$C_6$ alkyl.

13. The method of claim 9, wherein the lens-forming composition comprises: (i)(a) from about 5% to about 60% by weight of at least one hydrophilic (meth)acrylamide-type monomer; (ii)(a) from about 5% to about 50% by weight of at least one siloxane-containing (meth)acrylamido monomer; (ii)(b) from about 5% to about 50% by weight of at least one polysiloxane vinylic crosslinker; (iii) from about 0.1% to about 2.5% by weight of said at least one polymerizable UV-absorbing compound and said at least one polymerizable HEVL-absorbing compound; and (iv) from about 0.05% to about 1.5% by weight of at least one acytin photoinitiator.

14. The method of claim 1, wherein the lens-forming composition comprises said at least one polysiloxane vinylic crosslinker which comprises:

a) an α,ω-(meth)acryloxy-terminated polydimethylsiloxane;

b) an α,ω-(meth)acrylamido-terminated polydimethylsiloxane;

c) an α,ω-vinyl carbonate-terminated polydimethylsiloxane;

d) an α,ω-vinyl carbamate-terminated polydimethylsiloxane;

e) a bis-3-methacryloxy-2-hydroxypropyloxypropyl polydimethylsiloxane;

f) N,N,N',N'-tetrakis(3-methacryloxy-2-hydroxypropyl)-alpha, omega-bis-3-aminopropyl-polydimethylsiloxane of various molecular weight;

g) a reaction product of glycidyl methacrylate with a di-amino-functionalized polydimethylsiloxane;

h) a reaction product of an azlactone-containing vinylic monomer with a d-hydroxyl-functionalized polydimethylsiloxane;

i) a vinylic crosslinker of formula (H)

(H)

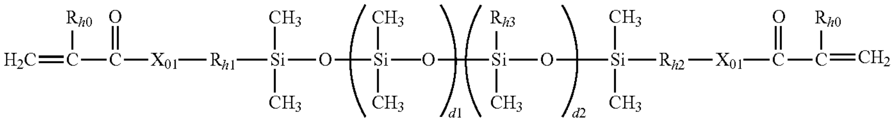

in which:

d1 is an integer of from 30 to 500 and d2 is an integer of from 1 to 75, provided that d2/d1 is from about 0.035 to about 0.15;

$X_{01}$ is O or $NR_{hN}$ in which $R_{hN}$ is hydrogen or $C_1$-$C_{10}$-alkyl;

$R_{h0}$ is hydrogen or methyl;

$R_{h1}$ and $R_{h2}$ independently of each other are a substituted or unsubstituted $C_1$-$C_{10}$ alkylene divalent radical or a divalent radical of —$R_{h4}$—O—$R_{h5}$— in which $R_{h4}$ and $R_{h5}$ independently of each other are a substituted or unsubstituted $C_1$-$C_{10}$ alkylene divalent radical;

$R_{h3}$ is a monovalent radical of any one of formula (H-a) to (H-e)

(H-a)

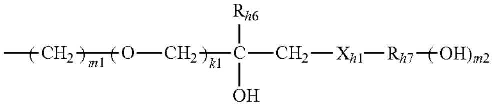

(H-b)

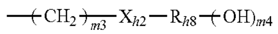

(H-c)

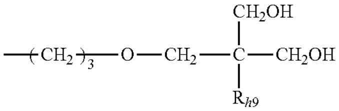

(H-d)

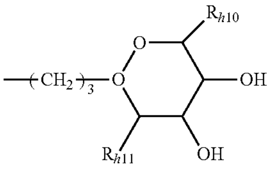

(H-e)

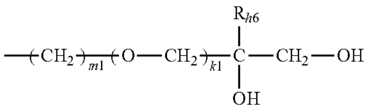

k1 is zero or 1; m1 is an integer of 2 to 4; m2 is an integer of 1 to 5; m3 is an integer of 3 to 6; m4 is an integer of 2 to 5;

$R_{h6}$ is hydrogen or methyl;

$R_{h7}$ is a $C_2$-$C_6$ hydrocarbon radical having (m2+1) valencies;

$R_{h8}$ is a $C_2$-$C_6$ hydrocarbon radical having (m4+1) valencies;

$R_{h9}$ is ethyl or hydroxymethyl;

$R_{h10}$ is methyl or hydromethyl;

$R_{h11}$ is hydroxyl or methoxy;

$X_{h1}$ is a sulfur linkage of —S— or a teriary amino linkage of —$NR_{h12}$— in which $R_{h12}$ is $C_1$-$C_1$ alkyl, hydroxyethyl, hydroxypropyl, or 2,3-dihydroxypropyl; and $X_{h2}$ is a linkage of

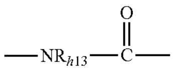 or 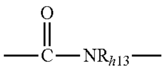

in which $R_{h13}$ is hydrogen or $C_1$-$C_{10}$ alkyl;

j) a vinylic crosslinker which comprises one sole polydiorganosiloxane segment and two terminal ethylenically-unsaturated groups selected from the group consisting of (meth)acryloyloxy groups, (meth) acryloylamino groups, vinyl carbonate groups, vinylcarbamate groups;

k) a chain-extended polysiloxane vinylic crosslinker which comprises at least two polydiorganosiloxane segment and a covalent linker between each pair of polydiorganosiloxane segments and two two terminal ethylenically-unsaturated groups selected from the group consisting of (meth)acryloyloxy groups, (meth) acryloylamino groups, vinyl carbonate groups, vinylcarbamate groups;

l) a vinylic crosslinker selected from the group consisting of α-(meth)acryloxypropyl terminated ω-$C_1$-$C_4$-alkyl terminated polydimethylsiloxane, α-(meth)acryloxy-2-hydroxypropyloxypropyl terminated ω-$C_1$-$C_4$-alkyl terminated polydimethylsiloxane, α-(2-hydroxyl-methacryloxypropyloxypropyl)-ω-$C_1$-$C_4$-alkyl-decamethylpentasiloxane, α-[3-(meth)acryloxyethoxy-2-hydroxypropyloxypropyl]-terminated ω-$C_1$-$C_4$-alkyl terminated polydimethylsiloxane, α-[3-(meth)acryloxy-propyloxy-2-hydroxypropyloxypropyl]-terminated ω-$C_1$-$C_4$-alkyl terminated polydimethylsiloxane, α-[3-(meth)acryloxyisopropyloxy-2-hydroxypropyloxypropyl]-terminated ω-$C_1$-$C_4$-alkyl terminated polydimethylsiloxane, α-[3-(meth)acryloxybutyloxy-2-hydroxypropyloxypropyl]-terminated ω-$C_1$-$C_4$-alkyl terminated polydimethylsiloxane, α-[3-(meth)acryloxyethylamino-2-hydroxypropyloxypropyl]-terminated ω-$C_1$-$C_4$-alkyl terminated polydimethylsiloxane, α-[3-(meth)acryloxypropylamino-2-hydroxypropyloxypropyl]-terminated ω-$C_1$-$C_4$-alkyl terminated polydimethylsiloxane, α-[3-(meth)acryloxy-butylamino-2-hydroxypropyloxypropyl]-terminated ω-$C_1$-$C_4$-alkyl terminated polydimethylsiloxane, α-(meth) acryloxy (polyethylenoxy)-2-hydroxypropyloxypropyl]-terminated ω-$C_1$-$C_4$-alkyl terminated polydimethylsiloxane, α-[(meth)acryloxy-2-hydroxypropyloxy-ethoxypropyl]-terminated ω-$C_1$-$C_4$-alkyl terminated polydimethylsiloxane, α-[(meth) acryloxy-2-hydroxypropyl-N-ethylaminopropyl]-terminated ω-$C_1$-$C_4$-alkyl terminated polydimethylsiloxane, α-[(meth)acryloxy-2-hydroxypropyl-aminopropyl]-terminated ω-$C_1$-$C_4$-alkyl terminated polydimethylsiloxane, α-[(meth)acryloxy-2-hydroxypropyloxy-(polyethylenoxy) propyl]-terminated ω-$C_1$-$C_4$-alkyl terminated polydimethylsiloxane, α-(meth)acryloylamidopropyloxypropyl terminated ω-$C_1$-$C_4$-alkyl terminated polydimethylsiloxane, α-N-methyl-(meth)acryloylamidopropyloxypropyl terminated ω-$C_1$-$C_4$-alkyl terminated polydimethylsiloxane, α-[3-(meth)acrylamidoethoxy-2-hydroxypropyloxypropyl]-terminated ω-$C_1$-$C_4$-alkyl polydimethylsiloxane, α-[3-(meth)acrylamidopropyloxy-2-hydroxypropyloxypropyl]-terminated ω-$C_1$-$C_4$-alkyl terminated polydimethylsiloxane, α-[3-(meth)acrylamidoisopropyloxy-2-hydroxypropyloxypropyl]-terminated ω-$C_1$-$C_4$-alkyl terminated polydimethylsiloxane, α-[3-(meth)acrylamidobutyloxy-2-hydroxypropyloxypropyl]-terminated ω-$C_1$-$C_4$-alkyl terminated polydimethylsiloxane, α-[3-(meth)acryloylamido-2-hydroxypropyloxypropyl] terminated ω-$C_1$-$C_4$-alkyl polydimethylsiloxane, α-[3-[N-methyl-(meth)acryloylamido]-2-hydroxypropyloxypropyl] terminated ω-$C_1$-$C_4$-alkyl terminated polydimethylsiloxane, N-methyl-N'-(propyltetra(dimethylsiloxy) dimethylbutylsilane) (meth)acrylamide, N-(2,3-dihydroxypropane)-N'-(propyltetra(dimethylsiloxy) dimethylbutylsilane) (meth)acrylamide, (meth)acryloylamidopropyltetra(dimethylsiloxy) dimethylbutylsilane, α-vinyl carbonate-terminated ω-$C_1$-$C_4$-alkyl-terminated polydimethylsiloxanes, α-vinyl carbamate-terminated ω-$C_1$-$C_4$-alkyl-terminated polydimethylsiloxane; or m) a mixture thereof.

15. The method of claim 14, wherein the lens-forming composition comprises at least one silicone-containing vinylic monomer of formula (M1) or (M2)

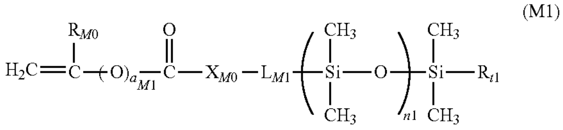

(M1)

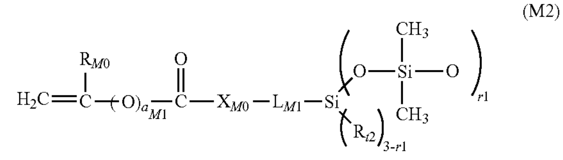

(M2)

in which: $a_{M1}$ is zero or 1; $R_{M0}$ is H or methyl; $X_{M0}$ is O or $NR_{M1}$; $L_{M1}$ is a $C_2$-$C_8$ alkylene divalent radical or a divalent radical of $$—L_{M1}'—X_{M1}—L_{M1}''—,\quad —(C_2H_4O)_{v1}—CONH—L_{M1}''—,$$

$$—(C_2H_4O)_{v1}—L_{M1}''—,$$

$$—L_{M1}'—NHCOO—(C_2H_4O)_{v1}—L_{M1}''—,$$

$$—CH_2—CH(OH)—CH_2—X_{M1}'—(C_2H_4O)_{v2}—L_{M1}''—,$$

$$—L_{M1}'—X_{M1}'—CH_2—CH(OH)—CH_2—O—L_{M1}''—,\ \text{or}$$

$$—(C_2H_4O)_{v1}—CH_2—CH(OH)—CH_2—O—L_{M1}''—;$$

$L_{M1}'$ is a $C_2$-$C_8$ alkylene divalent radical which has zero or one hydroxyl group; $L_{M1}''$ is $C_3$-$C_8$ alkylene divalent radical which has zero or one hydroxyl group; $X_{M1}$ is O, $NR_{M1}$, NHCOO, OCONH, $CONR_{M1}$, or $NR_{M1}CO$; $R_{M1}$ is H or a $C_1$-$C_4$ alkyl having 0 to 2 hydroxyl group; $R_{t1}$ and $R_{t2}$ independent of each other are a $C_1$-$C_6$ alkyl; $X_{M1}'$ is O or $NR_1$; v1 is an integer of 1 to 30; v2 is an integer of 0 to 30; n1 is an integer of 3 to 40; and r1 is an integer of 2 or 3.

16. The method of claim 14, wherein the lens-forming composition comprises tris(trimethylsilyloxy) silylpropyl(meth)acrylate, [3-(meth)acryloxy-2-hydroxypropyloxy] propylbis(trimethylsiloxy)methylsilane, [3-(meth)acryloxy-2-hydroxypropyloxy]propylbis(trimethylsiloxy)butylsilane, 3-(meth)acryloxy-2-(2-hydroxyethoxy)-propyloxy)propylbis(trimethylsiloxy)methylsilane, 3-(meth)acryloxy-2-hydroxypropyloxy)propyltris(trimethylsiloxy) silane, N-[tris (trimethylsiloxy) silylpropyl]-(meth)acrylamide, N-(2-hydroxy-3-(3-(bis(trimethylsilyloxy)methylsilyl) propyloxy)propyl)-2-methyl (meth)acrylamide, N-(2-hydroxy-3-(3-(bis(trimethylsilyloxy)methylsilyl)-propyloxy) propyl) (meth)acrylamide, N-(2-hydroxy-3-(3-(tris(trimethylsilyloxy) silyl)-propyloxy)propyl)-2-methyl acrylamide, N-(2-hydroxy-3-(3-(tris(trimethylsilyloxy)-silyl) propyloxy)propyl) (meth)acrylamide, N-[tris(dimethylpropylsiloxy) silylpropyl]-(meth)acrylamide, N-[tris(dimethylphenylsiloxy)-silylpropyl] (meth)acrylamide, N-[tris (dimethylethylsiloxy)-silylpropyl] (meth)acrylamide, N, N-bis[2-hydroxy-3-(3-(bis(trimethylsilyloxy)methylsilyl)-propyloxy)propyl]-2-methyl (meth)acrylamide, N,N-bis[2-hydroxy-3-(3-(bis(trimethylsilyloxy)methylsilyl) propyloxy)-propyl] (meth)acrylamide, N,N-bis[2-hydroxy-3-(3-(tris(trimethylsilyloxy) silyl) propyloxy)-propyl]-2-methyl (meth)acrylamide, N,N-bis[2-hydroxy-3-(3-(tris(trimethylsilyloxy) silyl)-propyloxy)propyl] (meth)acrylamide, N-[2-hydroxy-3-(3-(t-butyldimethylsilyl) propyloxy)-propyl]-2-methyl (meth)acrylamide, N-[2-hydroxy-3-(3-(t-butyldimethylsilyl) propyloxy)-propyl] (meth)acrylamide, N,N-bis[2-hydroxy-3-(3-(t-butyldimethylsilyl) propyloxy) propyl]-2-methyl (meth)acrylamide, N-2-(meth)acryloxyethyl-O-(methyl-bis-trimethylsiloxy-3-propyl) silyl carbamate, 3-(trimethylsilyl) propylvinyl carbonate, 3-(vinyloxycarbonylthio)-propyl-tris(trimethyl-siloxy) silane, 3-[tris(trimethylsiloxy) silyl]propylvinyl carbamate, 3-[tris(trimethylsiloxy) silyl]propyl allyl carbamate, 3-[tris (trimethylsiloxy) silyl]propyl vinyl carbonate, or a combination thereof.

17. The method of claim 14, wherein the lens-forming composition comprises 2-[2'-hydroxy-5'-(2-methacryloxyethyl)phenyl)]-2H-benzotriazole, and at least one polymerizable HEVL-absorbing compound which is 2-{2'-Hydroxy-3'-tert-butyl-5'-[3'-methacryloyloxypropoxy]-phenyl}-2H-benzotriazole, 2-{2'-Hydroxy-3'-tert-butyl-5'-[3'-methacryloyloxypropoxy]-phenyl}-5-methoxy-2H-benzotriazol), 2-{2'-Hydroxy-3'-tert-butyl-5'-[3'-methacryloyloxy-propoxy]phenyl}-5-chloro-2H-benzotriazole, 2-[2'-Hydroxy-3'-tert-butyl-5'-(3'-acryloyloxy-propoxy)phenyl]-5-trifluoromethyl-2H-benzotriazole, a soluble polymerizable Cu (II)-porphyrin, or combinations thereof.

18. The method of claim 1, wherein the lens-forming composition comprises: at least one non-silicone vinylic crosslinker; at least one blending vinylic monomer selected from the group consisting of $C_1$-$C_{10}$ alkyl(meth)acrylate, cyclopentylacrylate, cyclohexylmethacrylate, cyclohexylacrylate, isobornyl(meth)acrylate, styrene, 4,6-trimethylstyrene, t-butyl styrene, trifluoroethyl(meth)acrylate, hexafluoro-isopropyl(meth)acrylate, hexafluorobutyl(meth) acrylate, and combinations thereof; at least one photochromic compound; or combinations thereof, wherein said at least one photochromic compound comprises a naphthopyran, an indeno-fused naphthopyran, a heterocyclic ring-fused naphthopyrian, a benzopyran, a phenanthropyran, a quinopyran, a quinolinopyran, a fluoroanthenopyran, an anthracene-fused pyran, a tetracene-fused pyran, a spiro (benzindoline) naphthopyran, a spiro(indoline) naphthopyran, a spiro(indoline) benzopyran, a spiro(indoline) quinopyran, a spiro(indoline) pyran, a naphthoxazine, a spirobenzopyran, a spirobenzothiopyran, a naphthacenedione, a benzoxazine, a spirooxazine, a naphthoxazine, a spiro(benzindoline) naphthoxazine, a spiro(indoline) naphthoxazine, a spiro(indoline) pyrido-benzoxazine, a spiro (indoline) benzoxazine, a spiro(benzindoline) benzoxazine, a spiro(benzindoline) pyridobenzoxazine, a spiro(indoline) fluoranthenoxazine, a spiro(indoline)-quinoxazine, a spiropiperidine-naphthopyran, a piro (indoline) pyronobenzoxazinone, a benzospiropyran, a naphthospiropyran, a spirobenzoxazine-pyrrolopyridine, a spironaphthoxazine-pyrrolopyrridine, a spiro-oxazepin-benzoxazine, a spiro-oxazepin-naphthoxazine, a spiro(indoline) benzothiazoloxazine, a spiro(indoline) benzopyrroloxazine, a spiro(indoline) quinazolino-oxazine, a spiro(indoline)-anthracenobenzoxazine, a benzofurobenzopyran, a benzothienobenzopyran, a naphthofurobenzopyran, a benzopyrano-fused naphthopyran, a spiro(isoindoline)-naphthoxazine, a spiro(isoindoline) benzoxazine, or a mixture thereof.

19. The method of claim 1, wherein said at least one acyltin photoinitiator comprises tetrakis(2,4,6-trimethylbenzoyl) stannane.

20. The method of claim 5, wherein the lens-forming composition comprises a vinylic crosslinker selected from the group consisting of N,N'-methylene-bis-(meth)acrylamide, N,N'-ethylene-bis-(meth)acrylamide, N,N'-dihydroxyethylene-bis-(meth)acrylamide, 1,3-bis(acrylamidopropyl)-1,1,3,3-tetramethyldisiloxane, 1,3-bis (methacrylamidopropyl)-1,1,3,3-tetramethyldisiloxane, and combinations thereof.

* * * * *